(12) United States Patent
Wang et al.

(10) Patent No.: US 11,970,282 B2
(45) Date of Patent: Apr. 30, 2024

(54) AIRCRAFT THRUST MANAGEMENT WITH A FUEL CELL

(71) Applicant: General Electric Company, Schenectady, NY (US)

(72) Inventors: Honggang Wang, Clifton Park, NY (US); Kum Kang Huh, Niskayuna, NY (US); Michael Anthony Benjamin, Cincinnati, OH (US); Koji Asari, Sharonville, OH (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 17/568,892

(22) Filed: Jan. 5, 2022

(65) Prior Publication Data

US 2023/0211889 A1    Jul. 6, 2023

(51) Int. Cl.
*B64D 27/24* (2006.01)
*B64D 27/10* (2006.01)
(Continued)

(52) U.S. Cl.
CPC ............. *B64D 31/12* (2013.01); *B64D 27/10* (2013.01); *B64D 27/24* (2013.01);
(Continued)

(58) Field of Classification Search
CPC ...... F02C 6/00; F02C 6/02; F02C 3/04; F02C 9/28; F02C 7/32; F02C 7/042; F02C 7/262
See application file for complete search history.

(56) References Cited

U.S. PATENT DOCUMENTS

| | | |
|---|---|---|
| 3,658,279 A | 4/1972 | Robertson |
| 3,805,517 A | 4/1974 | Sewell et al. |

(Continued)

FOREIGN PATENT DOCUMENTS

| | | |
|---|---|---|
| CN | 106976405 A | 7/2017 |
| DE | 102005012230 A1 | 10/2005 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Thuyhang N Nguyen
(74) *Attorney, Agent, or Firm* — Dority & Manning, P.A.

(57) ABSTRACT

Systems and methods of aircraft thrust management are provided. For example, a propulsion system for an aircraft comprises a fuel cell assembly comprising a fuel cell, a turbomachine, and a controller comprising memory and one or more processors. The memory stores instructions that, when executed by the one or more processors, cause the propulsion system to perform operations including receiving data indicative of a propulsion system thrust discrepancy and modifying an output of the fuel cell in response to receiving data indicative of the propulsion system thrust discrepancy. Modifying the fuel cell output may include modifying output products, an electrical power output, or both of the fuel cell to balance the thrust provided by the propulsion system.

17 Claims, 10 Drawing Sheets

(51) Int. Cl.
*B64D 31/12* (2006.01)
*B64D 27/02* (2006.01)
*B64D 41/00* (2006.01)

(52) U.S. Cl.
CPC .. *B64D 2027/026* (2013.01); *B64D 2041/005* (2013.01); *B64D 2221/00* (2013.01)

(56) References Cited

U.S. PATENT DOCUMENTS

| | | |
|---|---|---|
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |
| 5,968,680 A | 10/1999 | Wolfe et al. |
| 6,183,703 B1 | 2/2001 | Hsu et al. |
| 6,296,957 B1 | 10/2001 | Graage |
| 6,348,278 B1 | 2/2002 | LaPierre et al. |
| 6,630,264 B2 | 10/2003 | Haltiner, Jr. et al. |
| 6,641,084 B1 | 11/2003 | Huber et al. |
| 6,834,831 B2 | 12/2004 | Daggett |
| 7,279,243 B2 | 10/2007 | Haltiner, Jr. et al. |
| 7,285,350 B2 | 10/2007 | Keefer et al. |
| 7,380,749 B2 | 6/2008 | Fucke et al. |
| 7,456,517 B2 | 11/2008 | Campbell et al. |
| 7,470,477 B2 | 12/2008 | Zizelman et al. |
| 7,513,119 B2 | 4/2009 | Zielinski et al. |
| 7,578,136 B2 | 8/2009 | Derouineau et al. |
| 7,659,021 B2 | 2/2010 | Horiuchi et al. |
| 7,709,118 B2 | 5/2010 | Lundberg |
| 7,743,499 B2 | 6/2010 | Pettit et al. |
| 7,781,115 B2 | 8/2010 | Lundberg |
| 7,854,582 B2 | 12/2010 | Ullyott |
| 7,926,287 B2 | 4/2011 | Ullyott et al. |
| 7,966,801 B2 | 6/2011 | Umeh et al. |
| 7,966,830 B2 | 6/2011 | Daggett |
| 8,141,360 B1 | 3/2012 | Huber |
| 8,232,670 B2 | 7/2012 | Breit et al. |
| 8,268,510 B2 | 9/2012 | Rock et al. |
| 8,288,060 B2 | 10/2012 | Bae et al. |
| 8,309,270 B2 | 11/2012 | Finnerty et al. |
| 8,373,381 B2 | 2/2013 | Raiser et al. |
| 8,394,552 B2 | 3/2013 | Gummalla et al. |
| 8,524,412 B2 | 9/2013 | Rock et al. |
| 8,722,270 B2 | 5/2014 | Pastula et al. |
| 8,727,270 B2 | 5/2014 | Burns et al. |
| 8,732,532 B2 | 5/2014 | Higeta |
| 8,820,677 B2 | 9/2014 | Rajashekara et al. |
| 8,846,255 B2 | 9/2014 | Dineen |
| 8,875,519 B2 | 11/2014 | Dooley |
| 8,950,703 B2 | 2/2015 | Bayliss et al. |
| 9,005,847 B2 | 4/2015 | Rock et al. |
| 9,028,990 B2 | 5/2015 | Gans et al. |
| 9,054,385 B2 | 6/2015 | Jones et al. |
| 9,059,440 B2 | 6/2015 | Hotto |
| 9,068,748 B2 | 6/2015 | Hoke |
| 9,118,054 B2 | 8/2015 | Gummalla et al. |
| 9,347,379 B2 | 5/2016 | Dooley |
| 9,359,956 B2 | 6/2016 | Dooley |
| 9,435,230 B2 | 9/2016 | Kim et al. |
| 9,444,108 B2 | 9/2016 | Brousseau |
| 9,464,573 B2 | 10/2016 | Remy et al. |
| 9,541,001 B2 | 1/2017 | Steinwandel et al. |
| 9,604,730 B2 | 3/2017 | Hagh et al. |
| 9,617,006 B2 | 4/2017 | Brugger et al. |
| 9,666,888 B2 | 5/2017 | Nagai et al. |
| 9,777,638 B2 | 10/2017 | Freidl |
| 9,897,041 B2 | 2/2018 | Hoffjann et al. |
| 9,966,619 B2 | 5/2018 | Libis et al. |
| 10,008,726 B2 | 6/2018 | Leah et al. |
| 10,035,607 B2 | 7/2018 | Wangemann et al. |
| 10,069,150 B2 | 9/2018 | Mata et al. |
| 10,224,556 B2 | 3/2019 | Lents et al. |
| 10,318,003 B2 | 6/2019 | Gannon et al. |
| 10,443,504 B2 | 10/2019 | Dalal |
| 10,446,858 B2 | 10/2019 | Palumbo et al. |
| 10,487,839 B2 | 11/2019 | Kupiszewski et al. |
| 10,622,653 B2 | 4/2020 | Whyatt et al. |
| 10,641,179 B2 | 5/2020 | Hayama et al. |
| 10,644,331 B2 | 5/2020 | Stoia et al. |
| 10,671,092 B2 | 6/2020 | DiRusso et al. |
| 10,676,208 B2 | 6/2020 | Wangemann et al. |
| 10,724,432 B2 | 7/2020 | Shapiro et al. |
| 10,737,802 B2 | 8/2020 | Krug et al. |
| 10,762,726 B2 | 9/2020 | Gansler et al. |
| 10,766,629 B2 | 9/2020 | Mercier-Calvairac et al. |
| 10,774,741 B2 | 9/2020 | Sennoun |
| 10,814,992 B2 | 10/2020 | Halsey et al. |
| 10,913,543 B2 | 2/2021 | Bailey et al. |
| 10,919,635 B2 | 2/2021 | Edgar et al. |
| 10,967,984 B2 | 4/2021 | Willford et al. |
| 10,978,723 B2 | 4/2021 | Lo et al. |
| 2002/0163819 A1 | 11/2002 | Treece |
| 2004/0081871 A1 | 4/2004 | Kearl et al. |
| 2004/0124308 A1* | 7/2004 | Daggett ............ H01M 8/04089 244/58 |
| 2004/0150366 A1 | 8/2004 | Ferrall et al. |
| 2006/0010866 A1 | 1/2006 | Rehg et al. |
| 2008/0155984 A1 | 7/2008 | Liu et al. |
| 2010/0133475 A1 | 6/2010 | Kobayashi et al. |
| 2010/0159303 A1 | 6/2010 | Rock et al. |
| 2011/0071707 A1 | 3/2011 | Crumm et al. |
| 2012/0161512 A1 | 6/2012 | Metzler et al. |
| 2012/0301814 A1 | 11/2012 | Beasley et al. |
| 2013/0099560 A1 | 4/2013 | Shipley et al. |
| 2013/0280634 A1 | 10/2013 | Park et al. |
| 2014/0023945 A1 | 1/2014 | Epstein et al. |
| 2014/0325991 A1 | 11/2014 | Liew et al. |
| 2015/0030947 A1 | 1/2015 | Saunders et al. |
| 2015/0151844 A1 | 6/2015 | Anton et al. |
| 2016/0260991 A1 | 9/2016 | Shapiro et al. |
| 2017/0070088 A1 | 3/2017 | Bernsten et al. |
| 2018/0003072 A1 | 1/2018 | Lents et al. |
| 2018/0080378 A1* | 3/2018 | Alecu ...................... F02C 6/02 |
| 2018/0141675 A1* | 5/2018 | Halsey ...................... H02J 7/34 |
| 2018/0166734 A1 | 6/2018 | Linde et al. |
| 2018/0319283 A1 | 11/2018 | Battin et al. |
| 2019/0121369 A1 | 4/2019 | DiRusso et al. |
| 2019/0136761 A1* | 5/2019 | Shapiro ............ H01M 8/04201 |
| 2019/0145273 A1 | 5/2019 | Frank et al. |
| 2019/0322379 A1* | 10/2019 | Mackin ................... F02C 7/057 |
| 2019/0383218 A1* | 12/2019 | Kupratis ................... F02C 6/02 |
| 2020/0014044 A1 | 1/2020 | Tichy et al. |
| 2020/0062414 A1 | 2/2020 | Hon et al. |
| 2020/0136163 A1 | 4/2020 | Holland et al. |
| 2020/0149479 A1 | 5/2020 | Des Roches-Dionne et al. |
| 2020/0194799 A1 | 6/2020 | Hart et al. |
| 2020/0256265 A1* | 8/2020 | Manoukian ............... F02C 6/02 |
| 2020/0313207 A1 | 10/2020 | Milcarek et al. |
| 2021/0003281 A1 | 1/2021 | Amble et al. |
| 2021/0075034 A1* | 3/2021 | Irie .................. H01M 8/04761 |
| 2021/0115857 A1 | 4/2021 | Collopy |

FOREIGN PATENT DOCUMENTS

| | | |
|---|---|---|
| EP | 3805107 A1 | 4/2021 |
| JP | 2009187756 A | 8/2009 |
| JP | 2011002308 A | 1/2011 |
| JP | 2018087501 A | 6/2018 |
| KR | 20090064853 A | 6/2009 |
| WO | WO2018108962 A1 | 6/2018 |
| WO | WO2020/011380 A1 | 1/2020 |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=

(56) References Cited

OTHER PUBLICATIONS

5e1a000b517423bb51a8f713ca211b68&mc=true&node=pt14.1.33&rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

\* cited by examiner

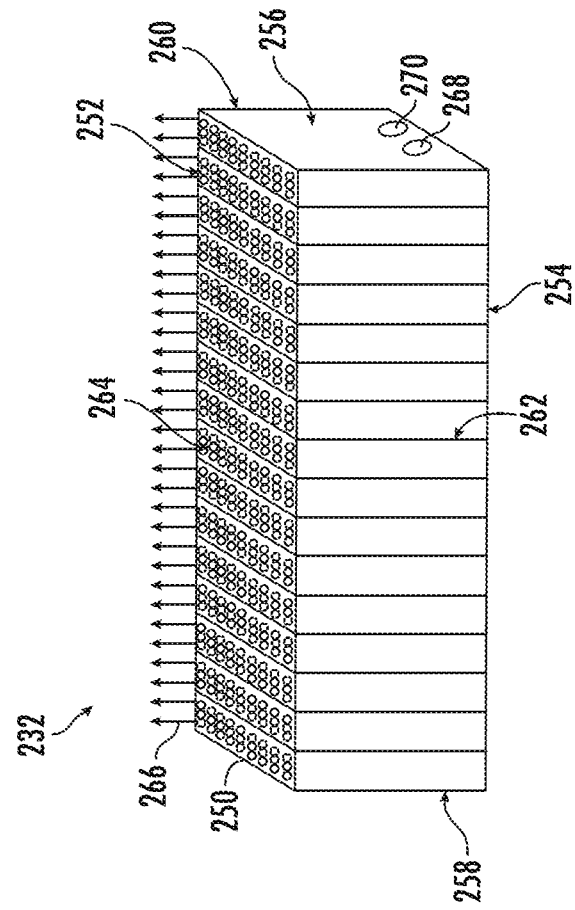
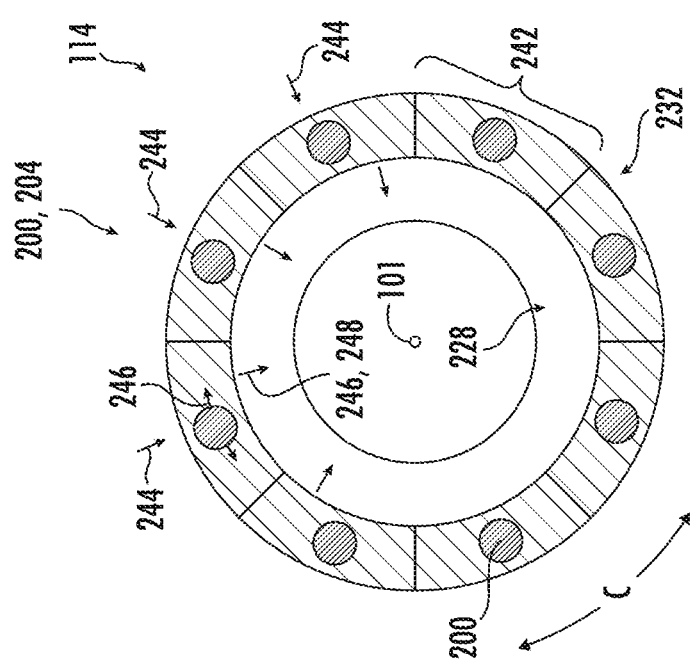
FIG. 4
FIG. 3

AIRCRAFT THRUST MANAGEMENT WITH A FUEL CELL

FIELD

The present disclosure relates to thrust management of an aircraft, such as thrust management via an aircraft propulsion system including a fuel cell.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating at least the compressor section to power the gas turbine engine. Usually, blades in the turbine section are mechanically coupled via one or more shafts to the fan assembly such that the rotational energy extracted in the turbine section also rotates the fan assembly to propel an aircraft incorporating such a gas turbine engine in flight.

The turbomachine also may drive a generator to produce electrical power, which may be used to generate propulsive thrust, and other electrical loads also may be placed on the turbomachine. At least certain aircraft may include multiple turbomachines and electric machines, one or more electric propulsors, or both. Systems and methods for providing a balancing of thrust generation by these multiple sources of thrust would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 3 is a schematic, axial view of the exemplary integrated fuel cell and combustor assembly of FIG. 2.

FIG. 4 is a schematic view of a fuel cell of a fuel cell assembly in accordance with an exemplary aspect of the present disclosure as may be incorporated into the exemplary integrated fuel cell and combustor assembly of FIG. 2.

DETAILED DESCRIPTION

Figure 1:
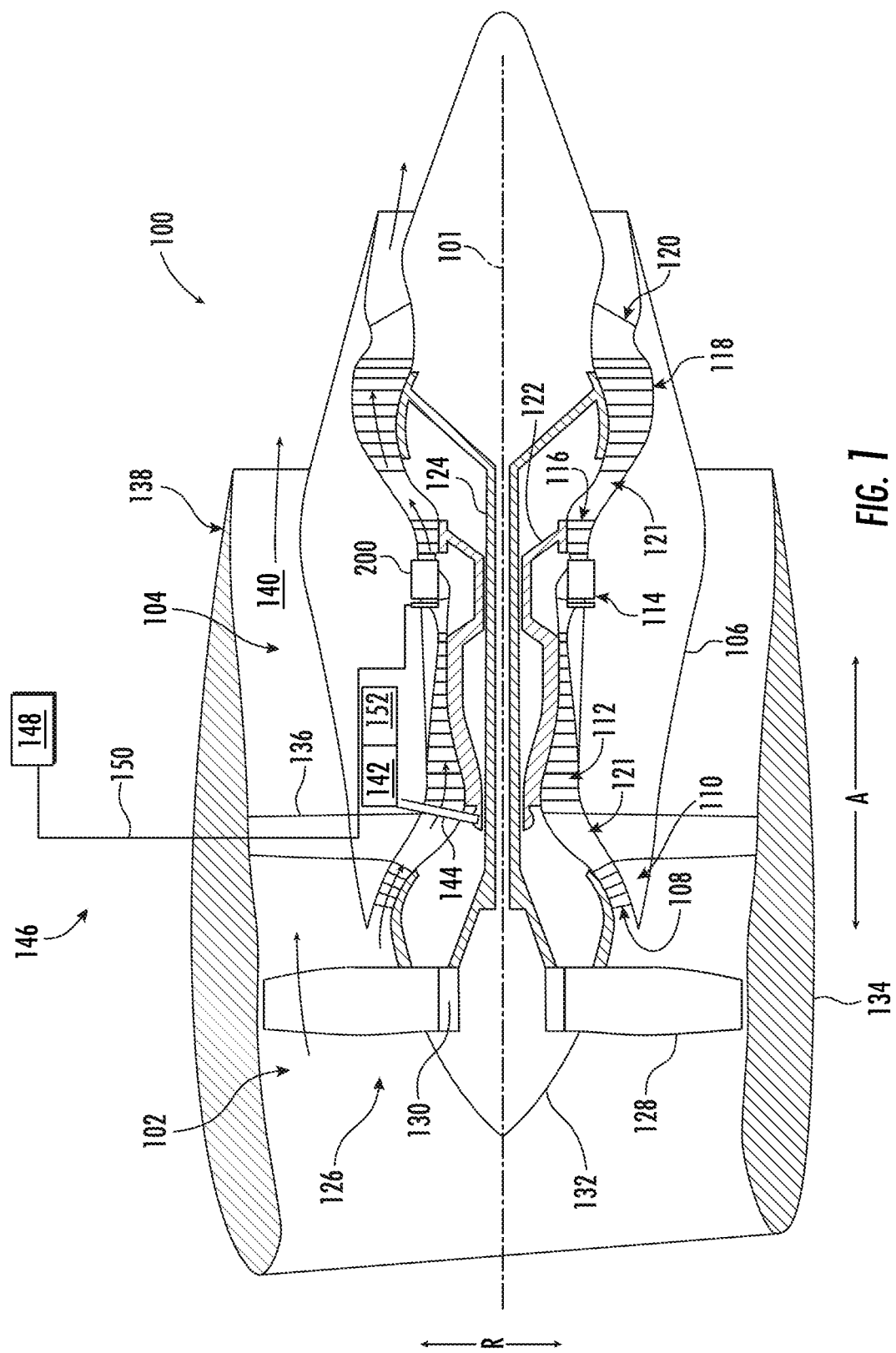
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high," or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As mentioned above, at least certain gas turbine engines include a turbomachine configured to drive an electric machine during operation as part of the propulsion system. Such may be referred to as a hybrid-electric gas turbine engine. Due to rapid electrical load changes, such as during rapid electrical load drops or loss of electrical machine torque, the propulsion system may experience a torque imbalance between the torque output of the engine and the torque load placed on the engine (or expected from the engine) by the electrical system. A torque imbalance may cause speed excursions of the engine and the generator, potentially leading to overspeed issues; poor power quality; and/or increased engine temperature, which may affect the life of the engine, may create undesirable aircraft handling issues, and/or and thrust asymmetry. In particular, for a propulsion system including a hybrid electric gas turbine engine as a first propulsor and a second propulsor (e.g., a second hybrid electric gas turbine engine, an electric propulsor, etc.), such a torque imbalance may create a situation where one of the propulsor creates a higher proportion of thrust relative to a balanced operation, generating a thrust imbalance. Thus, thrust management must be provided to mitigate or avoid such issues.

A propulsion system for an aircraft and methods of operating a propulsion system for an aircraft to provide such thrust management are provided. The propulsion system includes a fuel cell assembly having a fuel cell; a turbomachine; an electric machine; and a controller. The turbomachine, the electric machine, or both are configured to contribute to a propulsion system thrust generation during operation of the propulsion system. The controller includes a memory and one or more processors, and the memory stores instructions that, when executed by the one or more processors, cause the propulsion system to perform operations including receiving data indicative of a change in an electrical load on the turbomachine and modifying an output of the fuel cell in response to receiving data indicative of the change in the electrical load on the turbomachine receiving data indicative of a propulsion system thrust discrepancy, an modifying an output of the fuel cell in response to receiving data indicative of the propulsion system thrust discrepancy. For example, in certain embodiments, the output of the fuel cell may be output products provided from the fuel cell to a combustion section of the turbomachine to increase or decrease an amount of power generated by the turbomachine and reduce the propulsion system thrust discrepancy. Additionally, or alternatively, in other embodiments the output of the fuel cell may be an electrical power output provided to, e.g., the electric machine or a separate propulsion assembly to reduce the propulsion system thrust discrepancy.

Moreover, in certain exemplary embodiments, the propulsion system may include a first propulsion assembly having the turbomachine and electric machine, and a second propulsion assembly. The first and second propulsion assemblies may be configured to be positioned on opposing sides of an aircraft, and the propulsion system thrust discrepancy may be a thrust imbalance. With such a configuration, the output of the of the fuel cell may again be output products provided from the fuel cell to a combustion section of the turbomachine to increase or decrease an amount of power generated by the turbomachine, to in turn increase or decrease an amount of thrust generated by the first propulsion assembly relative to the second propulsion assembly to reduce the thrust imbalance. Additionally, or alternatively, in other embodiments the output of the fuel cell may again be an electrical power output provided to, e.g., the electric machine or the second propulsion assembly to reduce the thrust imbalance.

In one or more of these configurations, the fuel cell assembly may be capable of addressing a propulsion system thrust discrepancy, such as a thrust imbalance, relatively quickly and potentially without requiring significant modifications to a turbomachine operation.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
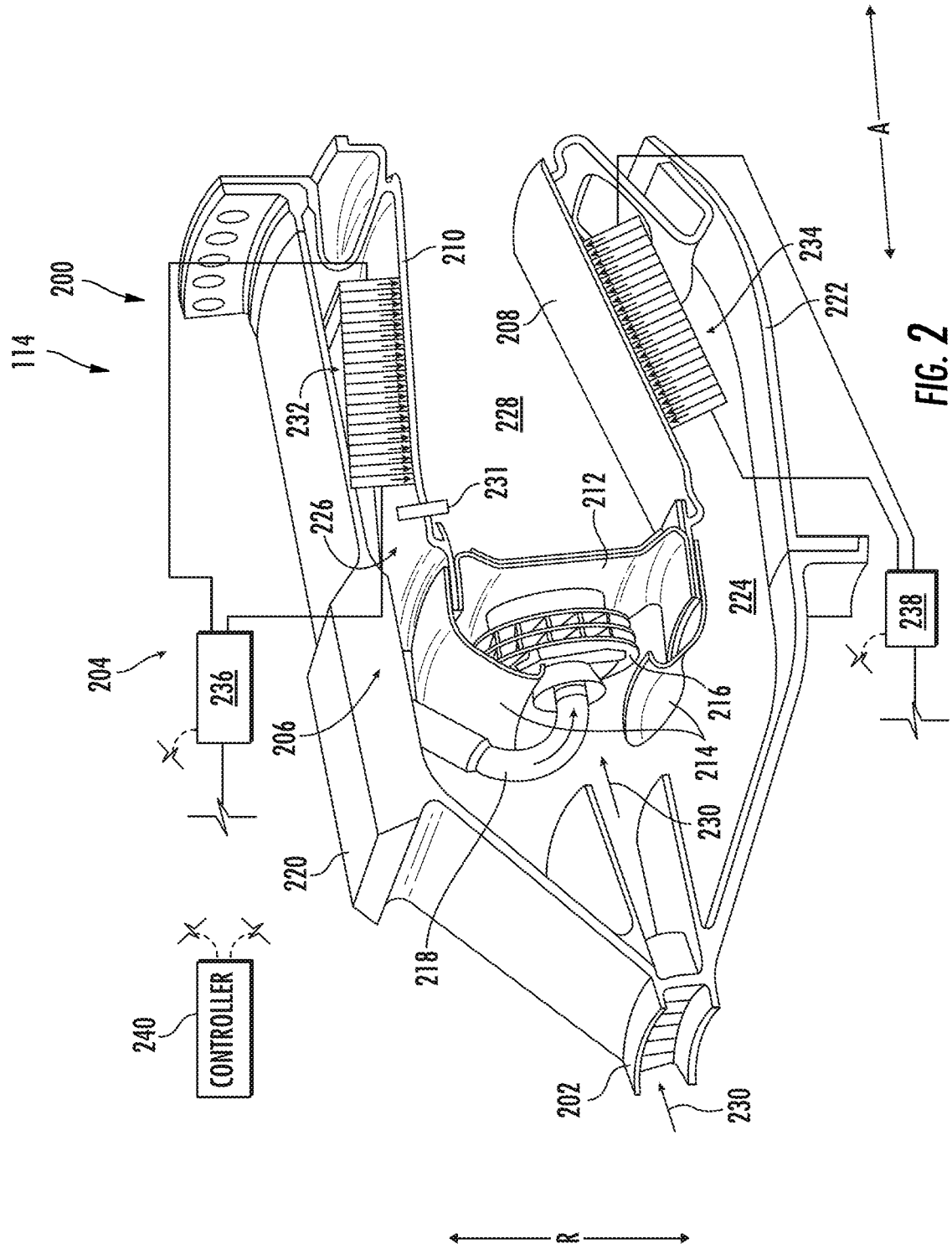
FIG. 2 is a perspective view of an integrated fuel cell and combustor assembly in accordance with the present disclosure.

Referring now to FIG. 2, FIG. 2 illustrates schematically a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2 may be configured in a similar manner as the first fuel cell stack 232, or alternatively may be configured in any other suitable manner.

It will be appreciated that, fuel cell assembly 204 of the present disclosure is divided into a plurality of fuel cell groups, with each fuel cell group capable of producing a discrete power output. As used herein, the term "group" as it relates to a fuel cell group of a fuel cell assembly refers to a plurality of fuel cells joined in a manner that may allow for electrical power to be outputted by the plurality of fuel cells separately from any other fuel cells of the fuel cell assembly during at least certain operations. For example, in the embodiment of FIG. 2, the first fuel cell stack 232 may be a first fuel cell group and the second fuel cell stack 234 may be a second fuel cell group. Alternatively, however, the fuel cell assembly 204 may include a plurality of fuel cell groups arranged along a length of the outer liner 210 along the axial direction A, a plurality of fuel cell groups arranged circumferentially along the outer liner 210 along the circumferential direction C, or a combination thereof. Separate power cables may be provided for each fuel cell group.

Further, it will be appreciated that although the exemplary fuel cell assembly 204 of FIGS. 2 through 4 generally includes the fuel cells, e.g., the fuel cells of the first fuel cell stack 232 and the second fuel cell stack 234, arranged along and integrated with the outer and inner liners 210, 208 of the combustor 206, in other embodiments, the fuel cell assembly 204 may be configured in any other suitable manner, in any other suitable location (e.g., axially forward of the combustor 206, spaced outward of the combustor 206 along the radial direction R, etc.). Further, in other embodiments, the fuel cell assembly 204 may use a chemistry other than solid oxide chemistry.

Figure 5:
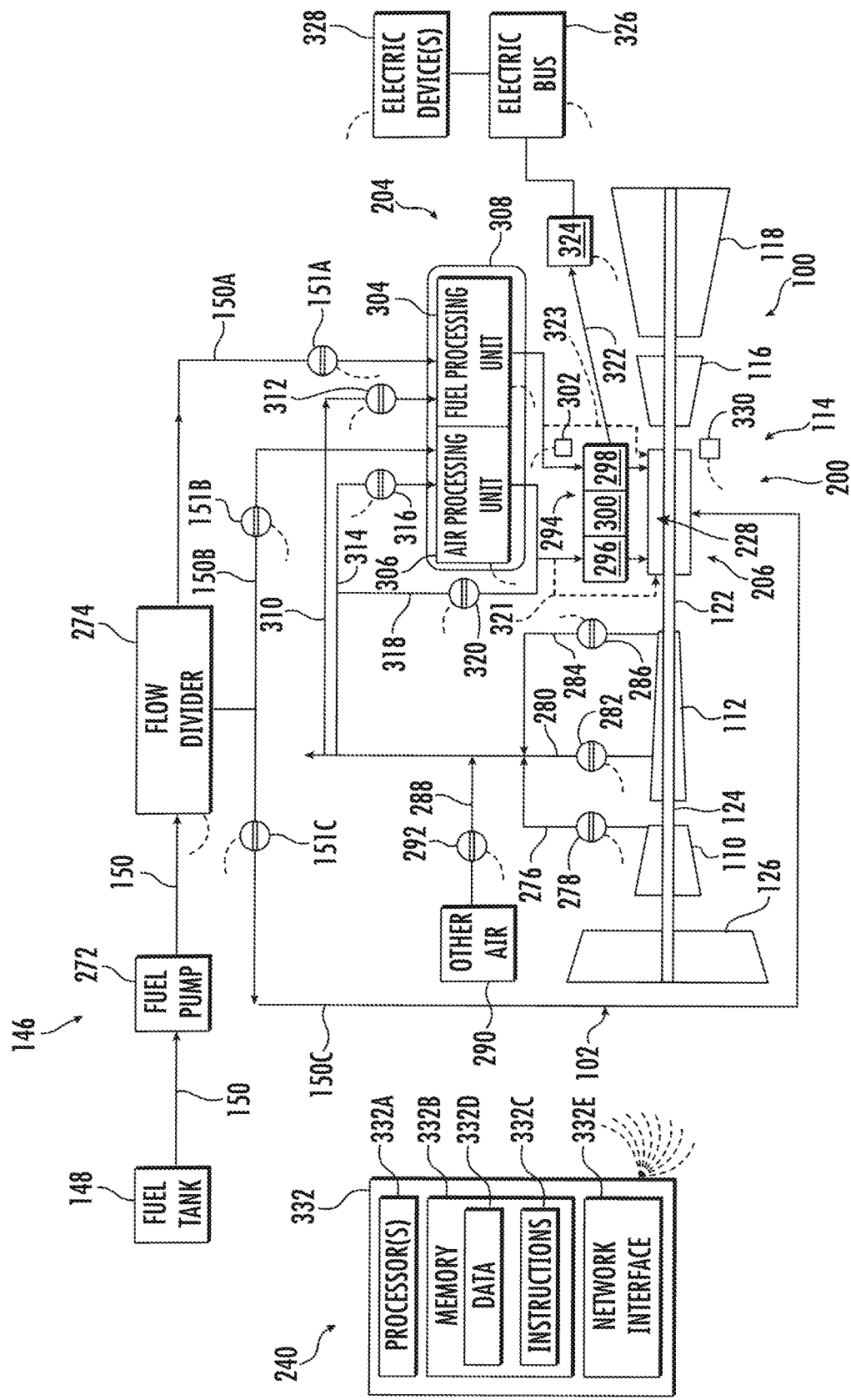
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell).

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electrical devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas. Other configurations are contemplated as well.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of the combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into the cathode side 296 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell 294 to allow a portion or all of an airflow conditioned by the air processing unit 306 (and combined with any bypass air through duct 318) to bypass the cathode side 296 of the fuel cell 294 and go directly to the combustion chamber 228. The bypass duct 321 may be in thermal communication with the fuel cell 294. The fuel cell assembly further includes a fuel bypass duct 323 extending around the fuel cell 294 to allow a portion or all of a reformed fuel from the fuel processing unit 304 to bypass the anode side 298 of the fuel cell 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power converter 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be adapted to draw an electric current from, or apply an electrical load to, the fuel cell stack 294. The one or more additional electrical devices 328 may be a power source, a power sink, or both. For example, the additional electrical devices 328 may be a power storage device (such as one or more batteries), an electric machine (an electric generator, an electric motor, or both), an electric propulsion device, etc. For example, the one or more additional electrical devices 328 may include the starter motor/generator of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of outputs (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 900 and/or method 1000), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery system 146 is configured to provide hydrogen fuel to the integrated fuel cell and combustor assembly 200, and in particular to the fuel cell assembly 204.

Figure 6:
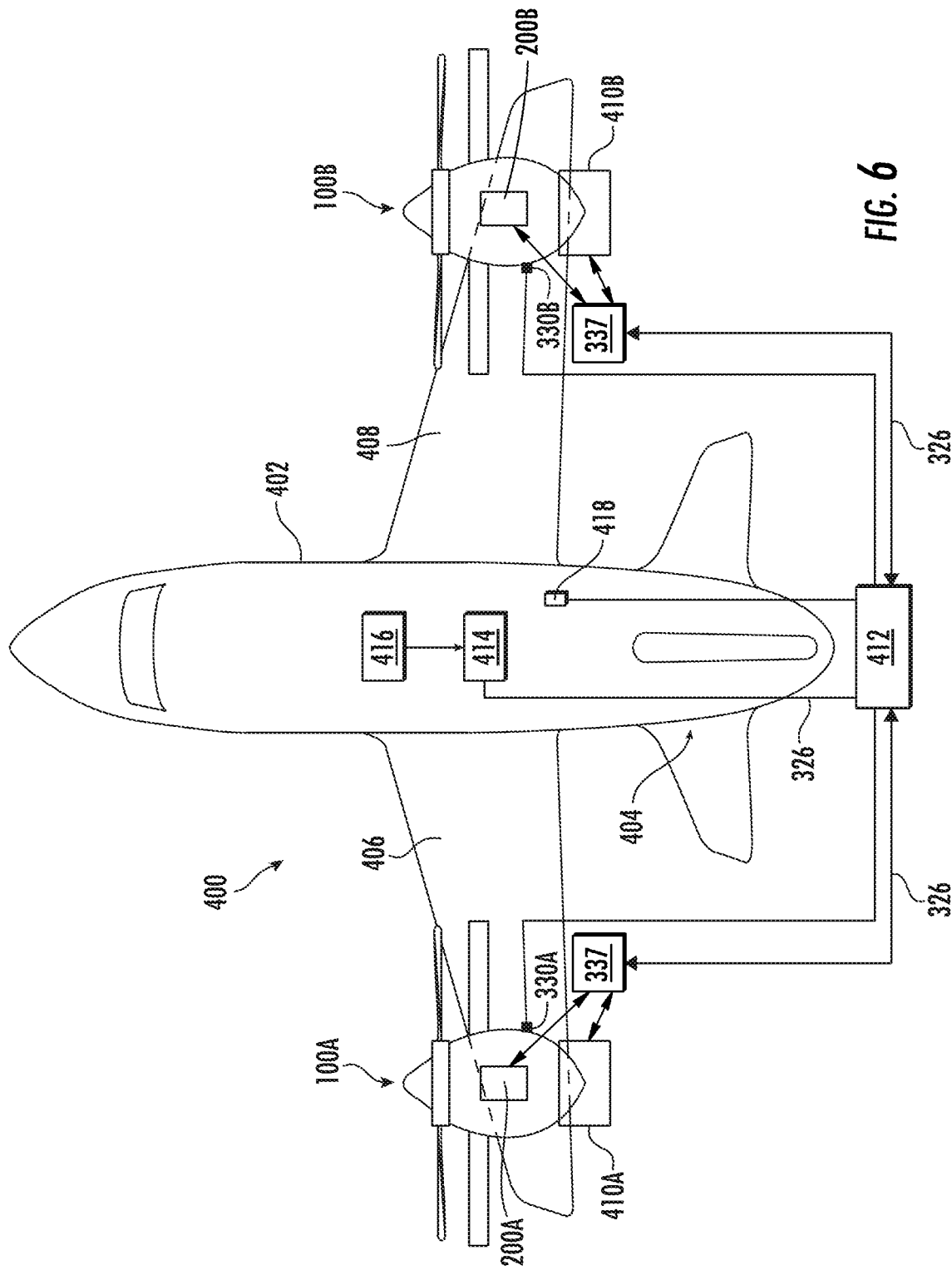
FIG. 6 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 6, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

In particular, for the exemplary embodiment depicted, the aircraft 400 is provided including a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and/or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 6, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 5 or may be in operative communication with a first gas turbine engine controller dedicated to the first gas turbine engine 100A and a second gas turbine engine controller dedicated to the second gas turbine engine 100B.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

In one embodiment, fuel cell assembly 204 of each integrated fuel cell and combustor assembly 200 (labeled 200A and 200B; see also FIGS. 2 through 5) is divided into a plurality of fuel cell groups, with each fuel cell group producing a discrete power output. For example, the first fuel cell stack 232 may be configured as a first fuel cell group with a first power output and the second fuel cell stack 234 may be configured as a second fuel cell group with a second power output. The first and second fuel cell groups may be arranged on the outer and inner liners 210, 208 of the combustor 206 (as in FIG. 2), may be arranged axially along one of the outer or inner liners 210, 208 of the combustor 206, may be arranged circumferentially along one or both of the outer or inner liners 210, 208 of the combustor 206, or may be arranged in any other suitable manner. Further, in other embodiments, the fuel cell assembly 204 may include more than two groups (e.g., 3, 4, 5, or more groups, such as up to 20 groups).

Figure 7:
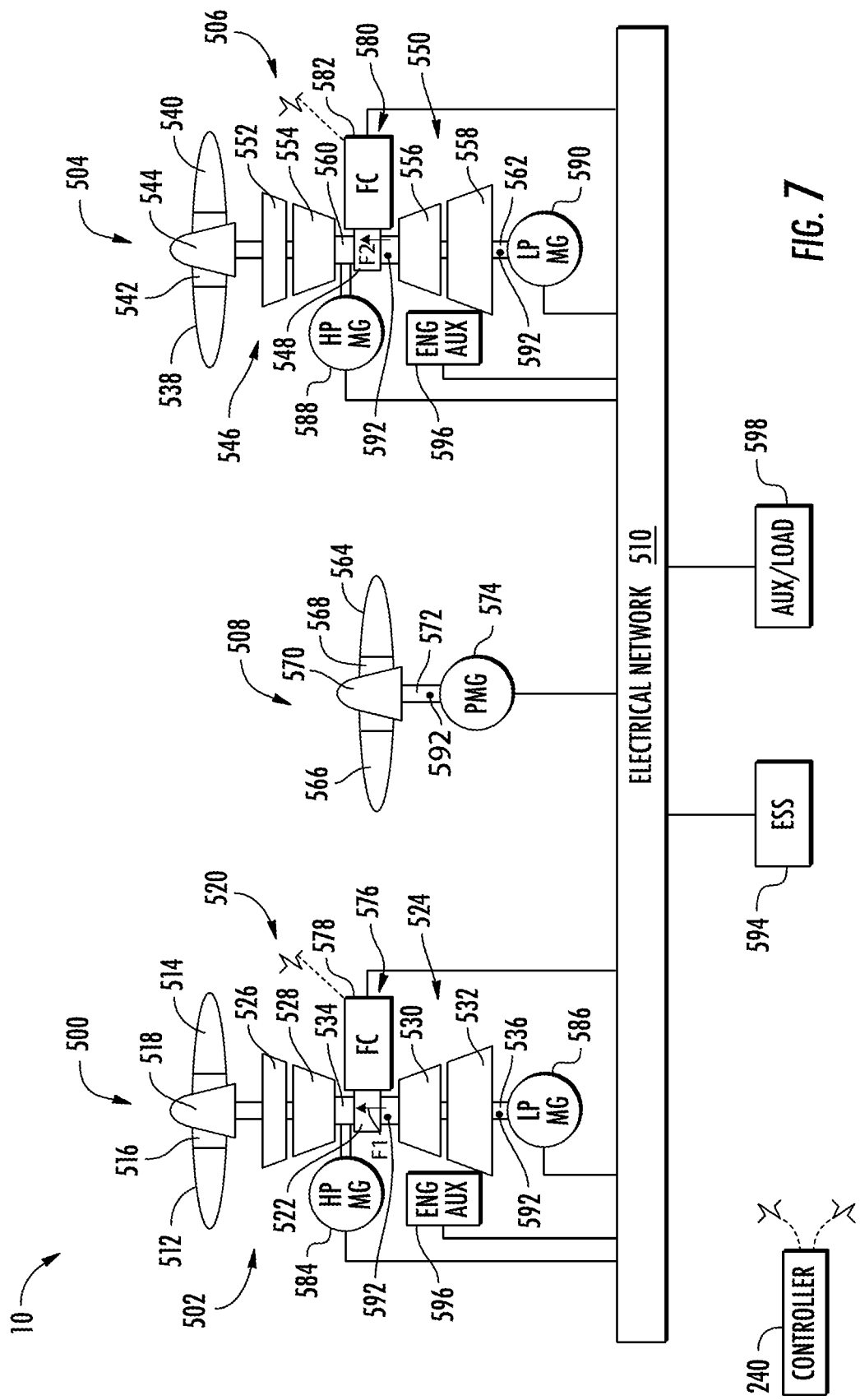
FIG. 7 is a schematic diagram of a propulsion system in accordance with an exemplary aspect of the present disclosure.

Turning now to FIG. 7, in the depicted embodiment the propulsion system is a propulsion system 10 that includes a first propulsion assembly 500 having a first turbomachine 502, a second propulsion assembly 504 having a second turbomachine 506, and a third propulsion assembly 508 electrically coupled to an electrical network 510. The electrical network 510 may be the electric bus 326, or the electrical network 510 may be configured similarly to the electric bus 326, described with respect to FIGS. 5 and 6.

In some embodiments, the propulsion system 10 includes only the first propulsion assembly 500, such that the second propulsion assembly 504, and the third propulsion assembly 508 are omitted. In other embodiments, the third propulsion assembly 508 is omitted such that the propulsion system 10 includes the first propulsion assembly 500 and the second propulsion assembly 504. In further embodiments, the propulsion system 10 includes only one turbomachine, such as the first turbomachine 502 of the first propulsion assembly 500, but multiple propulsion assemblies, such multiple propulsion assemblies configured in a similar manner as the second propulsion assembly 504. For instance, in FIG. 8 the second turbomachine 506 of the second propulsion assembly 504 and the third propulsion assembly 508 are shown in dashed lines to indicate that, in some embodiments, these components are optional, although it will be understood that, alternatively or additionally, the second propulsion assembly 504 also is optional.

Figure 8:
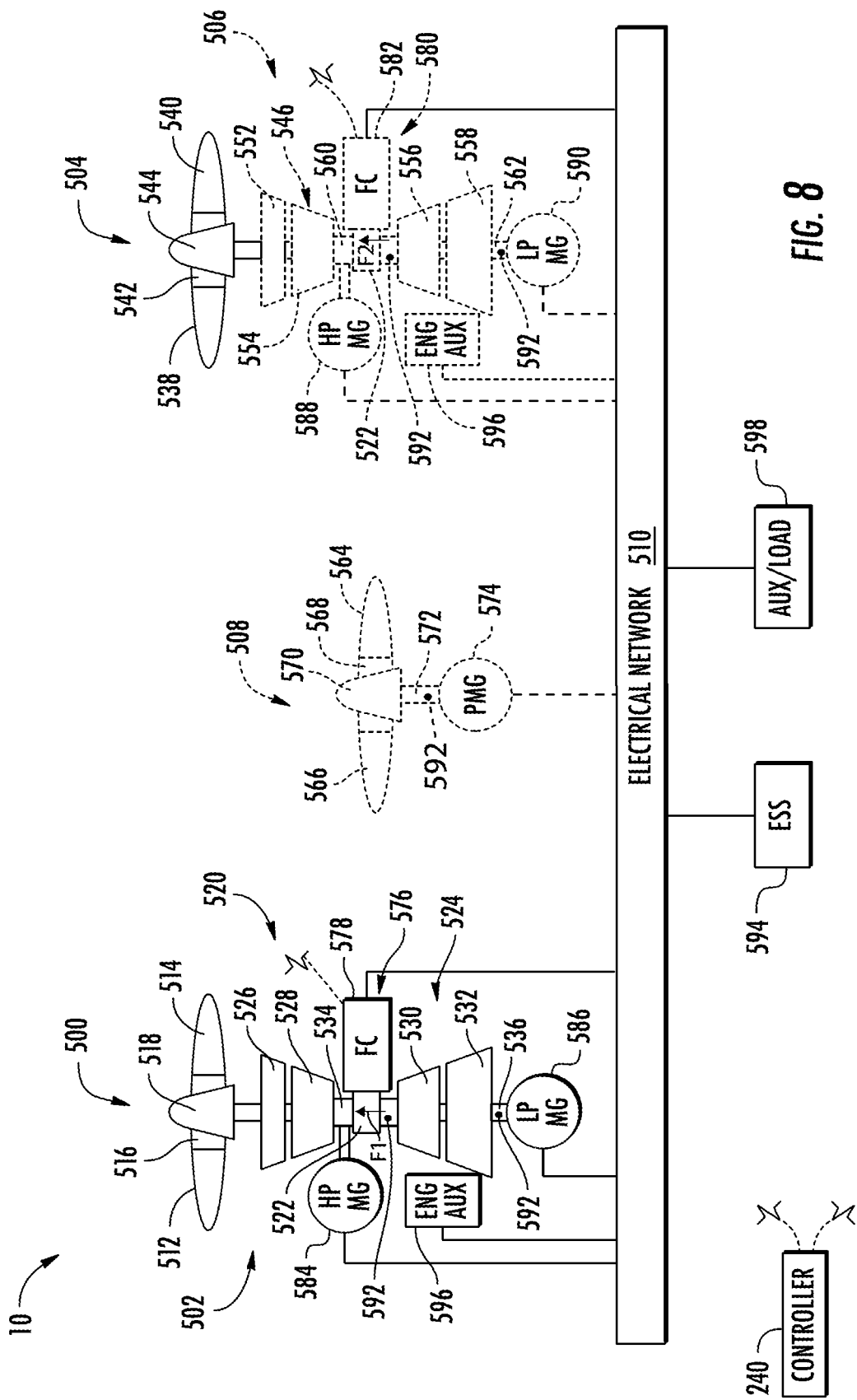
FIG. 8 is a schematic diagram of a propulsion system in accordance with another exemplary aspect of the present disclosure.

As shown in the embodiments of FIGS. 7 and 8, each of the first propulsion assembly 500, second propulsion assembly 504, and third propulsion assembly 508 include a fan section similar to the fan section 102 of the turbofan engine 100 described herein. Likewise, each of the first turbomachine 502 and second turbomachine 506 are configured similar to the turbomachine 104 of the turbofan engine 100. As such, the fan section of the first propulsion assembly 500 and the first turbomachine 502 together may be the first gas turbine engine 100A of the embodiment shown in FIG. 6, and the fan section of the second propulsion assembly 504 and the second turbomachine 506 together may be the second gas turbine engine 100B of the embodiment shown in FIG. 6.

Referring to FIGS. 7 and 8, the fan section of the first propulsion assembly 500 includes a fan 512 having a plurality of fan blades 514 coupled to a disk 516 in a spaced apart manner. The fan blades 514 and disk 516 are together rotatable about a centerline axis (not shown) of the first turbomachine 502, e.g., by a low pressure (LP) shaft 536 of the first turbomachine 502. The disk 516 is covered by a rotatable front hub 518 aerodynamically contoured to promote an airflow through the plurality of fan blades 514. In some embodiments, the fan section of the first propulsion assembly 500 is ducted, with an annular fan casing or outer nacelle circumferentially surrounding the fan 512 and/or at least a portion of the first turbomachine 502, similar to the nacelle 134 shown in FIG. 1. In other embodiments, the fan section of the first propulsion assembly 500 is unducted, with no fan casing or outer nacelle circumferentially surrounding the fan 512. Either ducted or unducted, it will be understood that the fan section of the first propulsion assembly 500 is configured to generate thrust, such that the first propulsion assembly 500 may be any suitable propulsor and need not include a fan assembly.

The first turbomachine 502 includes a compressor section 520, a combustion section 522, and a turbine section 524 arranged in serial flow order. The combustion section 522 of the first turbomachine 502 is configured to receive a first flow F1 of aviation fuel from an aircraft fuel supply, e.g., the fuel delivery system 146 (FIG. 1). The compressor section 520 includes a booster or low pressure (LP) compressor 526 and a high pressure (HP) compressor 528. The turbine section 524 includes a high pressure (HP) turbine 530 and a low pressure (LP) turbine 532. The first turbomachine 502 further includes a high pressure (HP) shaft or spool 534 drivingly connecting the HP turbine 530 to the HP compressor 528, and the low pressure (LP) shaft or spool 536 drivingly connecting the LP turbine 532 to the LP compressor 526.

Similarly, the fan section of the second propulsion assembly 504 includes a fan 538 having a plurality of fan blades 540 coupled to a disk 542 in a spaced apart manner. The fan blades 540 and disk 542 are together rotatable about a centerline axis (not shown) of the second turbomachine 506, e.g., by a low pressure (LP) shaft 562 of the second turbomachine 506. The disk 542 is covered by a rotatable front hub 544 aerodynamically contoured to promote an airflow through the plurality of fan blades 540. In some embodiments, the fan section of the second propulsion assembly 504 is ducted, with an annular fan casing or outer nacelle circumferentially surrounding the fan 538 and/or at least a portion of the second turbomachine 506, like the nacelle 134 shown in FIG. 1. In other embodiments, the fan section of the second propulsion assembly 504 is unducted, with no fan casing or outer nacelle circumferentially surrounding the fan 538. Either way, ducted or unducted, it will be understood that the fan section of the second propulsion assembly 504 is configured to generate thrust, such that the second propulsion assembly 504 may be any suitable propulsor and need not be a fan assembly.

The second turbomachine 506 includes a compressor section 546, a combustion section 548, and a turbine section 550 arranged in serial flow order. The combustion section 548 of the second turbomachine 506 is configured to receive a second flow F2 of aviation fuel from an aircraft fuel supply, e.g., the fuel delivery system 146 (FIG. 1). The compressor section 546 includes a booster or low pressure (LP) compressor 552 and a high pressure (HP) compressor 554. The turbine section 550 includes a high pressure (HP) turbine 556 and a low pressure (LP) turbine 558. The second turbomachine 506 further includes a high pressure (HP) shaft or spool 560 drivingly connecting the HP turbine 556 to the HP compressor 552, and a low pressure (LP) shaft or spool 562 drivingly connecting the LP turbine 558 to the LP compressor 552.

Further, the third propulsion assembly 508 includes a fan 564 having a plurality of fan blades 566 coupled to a disk 568 in a spaced apart manner. The fan blades 566 and disk 568 are together rotatable about an axis (not shown), e.g., by a shaft 572 coupled to an electric machine 574. The disk 568 is covered by a rotatable front hub 570 aerodynamically contoured to promote an airflow through the plurality of fan blades 566. In some embodiments, the third propulsion assembly 508 is ducted, with an annular fan casing or outer nacelle circumferentially surrounding the fan 564, like the nacelle 134 shown in FIG. 1. In other embodiments, the third propulsion assembly 508 is unducted, with no fan casing or outer nacelle circumferentially surrounding the fan 564.

As shown in FIGS. 7 and 8, the propulsion system 10 includes at least one fuel cell assembly. For instance, the propulsion system 10 has a first fuel cell assembly 576 including a first fuel cell 578, which defines an outlet (such as outlet 264 shown in FIG. 4) positioned to remove output products (such as output products 266) from the first fuel cell 578. The first turbomachine 502 is configured to receive the output products from the first fuel cell 578. Likewise, the propulsion system 10 has a second fuel cell assembly 580 including a second fuel cell 582, which defines an outlet (such as outlet 264 shown in FIG. 4) positioned to remove output products (such as output products 266) from the second fuel cell 582. The second turbomachine 506 is configured to receive the output products from the second fuel cell 582. It will be appreciated that, where the propulsion system 10 includes only one turbomachine, such as only the first turbomachine 502, the propulsion system to may include only one fuel cell assembly, such as only the first fuel cell assembly 576. Additionally, it will be appreciated that although the fuel cell assemblies shown in FIGS. 7 and 8 are integrated with the respective turbomachines, in other embodiments, the fuel cell assemblies may be positioned at any other suitable location spaced from the turbomachines. It will be further appreciated, however, that each fuel cell assembly may be configured as described above with respect to fuel cell assembly 204 depicted, e.g., in FIG. 2 and including a first fuel cell stack 232 configured with an outer liner 210 of a combustor assembly 200 of a respective turbomachine 502, 506 and a second fuel cell stack 234 configured with an inner liner 208 of the combustor assembly 200 of the respective turbomachine 502, 506.

Referring still to FIGS. 7 and 8, the electrical network 510 is in electric communication with one or more electrical devices, which may be adapted to draw an electric current from, or apply an electrical load to, the first turbomachine 502, the second turbomachine 506, the first fuel cell 578, and/or the second fuel cell 582. The one or more electrical devices may be a power source, a power sink, or both. For example, the electrical devices may be a first electric machine 584, a second electric machine 586, a third electric machine 588, and a fourth electric machine 590. Each electric machine 584, 586, 588, 590 may be an electric generator, an electric motor, or both (which may be referred to as a motor-generator). Additional electrical devices in electric communication with the electrical network 510 may include one or more power storage devices (such as one or more batteries, supercapacitors, etc.); an electric propulsion device, such as the third propulsion assembly 508 having a fifth electric machine, which is also referred to herein as the electric machine 574 coupled to the shaft 572 of the third propulsion assembly 508, etc. The fifth electric machine 574 may be configured like the first electric machine 584, the second electric machine 586, the third electric machine 588, and/or the fourth electric machine 590.

Each of the first electric machine 584, the second electric machine 586, the third electric machine 588, the fourth electric machine 590, and the fifth electric machine 574 is rotatable with one of the first turbomachine 502 or the second turbomachine 506, and may be an embedded electric machine, an offset electric machine (e.g., rotatable with the gas turbine engine 100 through an accessory gearbox or suitable geartrain), etc. Further, each electric machine 584, 586, 588, 590, 574 need not be the same type of electric machine. For instance, at least one of the first electric machine 584, the second electric machine 586, the third electric machine 588, the fourth electric machine 590, and/or the fifth electric machine 574 may be an embedded electric machine while at least one of the first electric machine 584, the second electric machine 586, the third electric machine 588, the fourth electric machine 590, and/or the fifth electric machine 574 may be an offset electric machine. Moreover, although five electric machines are shown in FIG. 7, in at least some embodiments, the propulsion system 10 need not include each of the first electric machine 584, the second electric machine 586, the third electric machine 588, the fourth electric machine 590, and/or the fifth electric machine 574, e.g., as shown in FIG. 8.

In certain exemplary embodiments, the first electric machine 584 may be a starter motor/generator coupled to the HP shaft/spool 534 of the first turbomachine 502 and may be referred to as HP MG 584 as shown in FIG. 7. The first electric machine 584 may be rotatable with the HP compressor 528, the HP turbine 530, or both, of the first turbomachine 502. Further, the second electric machine 586 may be a starter motor/generator coupled to the LP shaft/spool 536 of the first turbomachine 502 and may be referred to as LP MG 586. The second electric machine 586 may be rotatable with the LP compressor 526, the LP turbine 532, or both, of the first turbomachine 502. Similarly, the third electric machine 588 may be a starter motor/generator coupled to the HP shaft/spool 560 of the second turbomachine 506 and may be referred to as HP MG 588. The third electric machine 588 may be rotatable with the HP compressor 554, the HP turbine 556, or both, of the second turbomachine 506. Moreover, the fourth electric machine 590 may be a starter motor/generator coupled to the LP shaft/spool 562 of the second turbomachine 506 and may be referred to as LP MG 590. The fourth electric machine 590 may be rotatable with the LP compressor 552, the LP turbine 558, or both, of the second turbomachine 506. Further, the fifth electric machine 574 may be a starter motor/generator coupled to the third propulsion assembly 508 as previously described and may be referred to as PMG 574 as shown in FIG. 7.

As previously discussed, the propulsion system 10 includes at least one propulsion assembly (e.g., first propulsion assembly 500, second propulsion assembly 504, and/or third propulsion assembly 508) and at least one turbomachine (e.g., first turbomachine 502 and/or second turbomachine 506), although in various embodiments, different combinations of number of propulsion assemblies, number of turbomachines, and connections between the at least one propulsion assembly and the at least one turbomachine are possible. For example, for at least some embodiments of the propulsion system 10 including the first propulsion assembly 500, the second propulsion assembly 504, and a turbomachine 502/506 (i.e., either the first turbomachine 502 or the second turbomachine 506), one of the first propulsion assembly 500 and the second propulsion assembly 504 is mechanically coupled to the turbomachine 502/506 and the other of the first propulsion assembly 500 and the second propulsion assembly 504 is electrically coupled to the turbomachine 502/506. Further, in such embodiments, the electrical network 510 may be electrically coupled to the fuel cell assembly 576/580 (i.e., either the first fuel cell assembly 576 or the second fuel cell assembly 580, which depends on whether the turbomachine 502/506 is either the first turbomachine 502 or the second turbomachine 506), the turbomachine 502/506, and at least one of the first propulsion assembly 500 and the second propulsion assembly 504. In such embodiments of the propulsion system 10 that also include the third propulsion assembly 508, the third propulsion assembly 508 may be electrically coupled to the turbomachine 502/506 via the electrical network 510.

As one example of the foregoing, for embodiments of the propulsion system 10 including the first propulsion assembly 500, the second propulsion assembly 504, and the first turbomachine 502, the first propulsion assembly 500 is mechanically coupled to the first turbomachine 502 and the second propulsion assembly 504 is electrically coupled to the first turbomachine 502. Further, the electrical network 510 is electrically coupled to the first fuel cell assembly 576, the first turbomachine 502, and at least the second propulsion assembly 504; the electrical network also may be electrically coupled to the first propulsion assembly 500. Moreover, when included, the third propulsion assembly 508 is electrically coupled to the first turbomachine 502 via the electrical network 510.

As further shown in the figures, the propulsion system 10, an aircraft (such as aircraft 400 shown in FIG. 6) including the propulsion system 10, or both, includes a controller, such as controller 240 described with respect to FIG. 5. For example, the controller 240 may be a standalone controller, a gas turbine engine controller (e.g., a full authority digital engine control, or FADEC, controller), an aircraft controller, a supervisory controller for a propulsion system (such as supervisory controller 412 described with respect to FIG. 6), a combination thereof, etc.

As described herein, e.g., with respect to FIG. 5, in at least certain embodiments, the controller 240 can include one or more computing device(s) 332. The computing device(s) 332 can include one or more processor(s) 332A and one or more memory device(s) 332B. In at least some embodiments, the one or more memory device(s) 332B store instructions that, when executed by the one or more processor(s) 332A cause the propulsion system 10 to perform operations including receiving data indicative of a propulsion system thrust discrepancy, modifying an output of the fuel cell in response to receiving data indicative of the propulsion system thrust discrepancy. The term "propulsion system thrust discrepancy" generally refers to an actual thrust generated by the propulsion system 10 being different than the desired or commanded thrust. For example, for a single turbomachine and single propulsion assembly configuration, the propulsion system thrust discrepancy may refer to the actual thrust being lower than a commanded thrust. For a propulsion system including multiple propulsor assemblies, the propulsion system thrust discrepancy may refer to a thrust imbalance between the multiple propulsor assemblies (e.g., more thrust relative to a balanced operation being produced from a starboard propulsion assembly relative to a port propulsion assembly, or vice versa).

In at least certain exemplary aspects, the data indicative of the propulsion system thrust discrepancy may be actual sensor data or may be a change in an electrical load on a turbomachine (such as the first turbomachine 502 and/or the second turbomachine 506). The change in the electrical load on a turbomachine may refer in an amount of electrical power extracted via an electric machine rotatable with the turbomachine. The change in electrical load may be a result of an increase in extraction of electrical power from an accessory system, a decrease in extraction of electrical power from an accessory system, a failure event, etc.

In such an exemplary aspect, modifying the output of the fuel cell in response to receiving data indicative of the propulsion system thrust discrepancy may include modifying the output products of the fuel cell (such as the first fuel cell 578 and/or the second fuel cell 582) in response to receiving data indicative of the change in the electrical load on the turbomachine.

For example, the controller 240 is configured to control the various components of the propulsion system 10 to take corrective action when a rapid electrical load change occurs on the turbomachine (e.g., the first turbomachine 502 and/or the second turbomachine 506). The rapid electrical load change may be a load decrease or a load increase. In the event of a load decrease, one or more electrical components of the propulsion system 10 may fail or otherwise be controlled to drop offline. For instance, one or more electrical loads applying a torque load on the first turbomachine 502 and/or the second turbomachine 506 cease demanding electrical power or are electrically disconnected from the system. When this occurs, the electrical load on the first turbomachine 502 and/or the second turbomachine 506 rapidly decreases, or stated another way, the torque countering the rotation of the output shaft of the first turbomachine 502 and/or the second turbomachine 506 rapidly decreases, resulting in a torque imbalance between the torque output of the first turbomachine 502 and/or the second turbomachine 506 and the torque load placed on the first turbomachine 502 and/or the second turbomachine 506 by the electrical system. In the event of a load increase, the electrical power demanded by the power consuming devices or loads electrically coupled with, e.g., the electrical network 510 cannot be delivered by one or more electrical power generating devices, such as the one or more electric machines described herein. That is, the demanded power is greater than the available power capable of being generated by the one or more electrical power generating devices. Such rapid electrical load changes may lead to a number of problems, such as overspeed issues (e.g., a speed excursion resulting from high power supply and low electrical load), poor power quality (e.g., system overvoltage), increased turbomachine temperature (which may affect the life of the turbomachine), significant and unsafe aircraft handling issues, thrust asymmetry, etc.

Figure 7A:
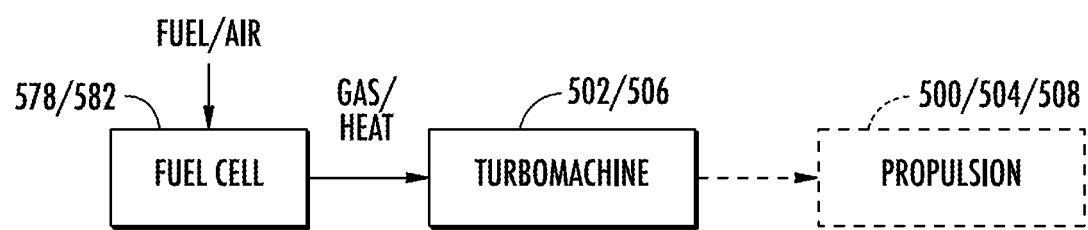
FIG. 7A is a schematic diagram of thrust management through gas/heat coupling between a fuel cell and a turbomachine in accordance with an exemplary aspect of the present disclosure.

Thus, as previously stated, in response to receiving data indicative of a change in the electrical load or demand on a turbomachine of the propulsion system 10, the controller 240 is configured to cause the propulsion system 10 to modify an output of an associated fuel cell. Referring to FIG. 7A, in conjunction with FIGS. 7 and 8, the output of the fuel cell is the output products or combustion gases 266 exhausted from the fuel cell to the combustion section of the associated turbomachine, and the controller 240 is configured to cause the propulsion system 10 to modify the output products of the fuel cell, which flow to the turbomachine. For instance, in response to receiving data indicative of an increase in the electrical load on the first turbomachine 502, one or more processor(s) 332A of the controller 240 execute instructions that cause the propulsion system 10 to modify the output products of the first fuel cell 578. By modifying the output products of the first fuel cell 578, the propulsion system 10 adjusts the exhaust gas (e.g., the combustion gas 266) of the first fuel cell 578 to boost the work of the turbine section 524 of the first turbomachine 502. The boost or increase in turbine work, via the first fuel cell 578, increases the power output of the first turbomachine 502 to help compensate for the increase in electrical load on the first turbomachine 502. Thus, the effects of the increase in electrical load can be minimized or avoided, which can prevent the problems described above that are associated with electrical load changes (such as overspeed, poor power quality, decreased engine life, aircraft handling issues, and thrust asymmetry). Compared to adding main fuel to combustor to boost or increase the work of the turbine output, the use of fuel cell may bring significant benefit of achieve the same turbine work boost without violating engine operability constraint such as temperature limits. For example, the use of fuel cell may bring in desirable gas composition at a desirable distribution within the combustor, which leads to lower turbine inlet temperature, and/or more even turbine temperature distribution, reduced emissions, etc.

It will be appreciated that a similar adjustment to the output products of the second fuel cell 582 can be made to minimize or obviate the effects of an electrical load change on the second turbomachine 506. For example, in response to receiving data indicative of an increase in the electrical load on the second turbomachine 506, one or more processor(s) 332A of the controller 240 execute instructions that cause the propulsion system 10 to modify the output products of the second fuel cell 582. By modifying the output products of the second fuel cell 582, the propulsion system 10 adjusts the exhaust gas (e.g., the combustion gas 266) of the second fuel cell 582 to boost the work of the turbine section 550 of the second turbomachine 506. The boost or increase in turbine work, via the second fuel cell 582, increases the power output of the second turbomachine 506 to help compensate for the increase in electrical load on the second turbomachine 506, thereby minimizing or preventing problems associated with electrical load changes on the second turbomachine 506 (such as those problems described above).

Figure 7B:
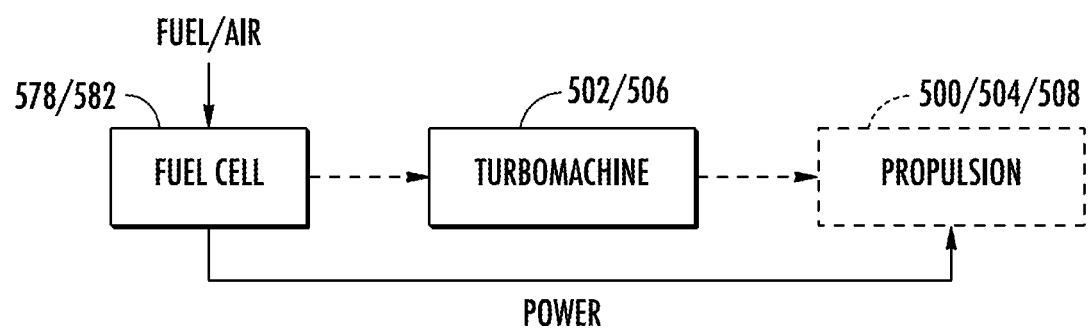
FIG. 7B is a schematic diagram of thrust management through power coupling between a fuel cell and a propulsion assembly in accordance with an exemplary aspect of the present disclosure.

Referring to FIG. 7B, in conjunction with FIGS. 7 and 8, the output of the fuel cell is the electrical power or current output of the fuel cell, and the controller 240 is configured to cause the propulsion system 10 to modify the power output of the fuel cell to a respective propulsion assembly (e.g., the first propulsion assembly 500, the second propulsion assembly 504, and/or the third propulsion assembly 508). For instance, in response to receiving data indicative of an increase in the electrical load on the first turbomachine 502, one or more processor(s) 332A of the controller 240 execute instructions that cause the propulsion system 10 to modify the power output of the first fuel cell 578 to the first propulsion assembly 500. By modifying the power output of the first fuel cell 578, the propulsion system 10, for example, increases the power output of the first fuel cell 578 to the first propulsion assembly 500 to compensate for an increase in electrical load on the first turbomachine 502, which can increase the torque output of the first turbomachine 502 to drive the first propulsion assembly 500. Thus, by providing electrical power to the first propulsion assembly 500 from the first fuel cell 578, the effects of the increase in electrical load can be minimized or avoided, which can prevent the problems described above that are associated with electrical load changes (such as overspeed, poor power quality, decreased engine life, aircraft handling issues, and thrust asymmetry).

It will be appreciated that a similar adjustment to the electrical power output of the second fuel cell 582 can be made to minimize or obviate the effects of an electrical load change on the second turbomachine 506. For example, in response to receiving data indicative of a decrease in the electrical load on the second turbomachine 506, one or more processor(s) 332A of the controller 240 execute instructions that cause the propulsion system 10 to modify the electrical power output of the second fuel cell 582 to the second propulsion assembly 504. By modifying the power output of the second fuel cell 582, the propulsion system 10, for example, increases the power output of the second fuel cell 582 to the second propulsion assembly 504 to compensate for an increase in electrical load on the second turbomachine 506, which can decrease the torque output of the second turbomachine 506 to drive the second propulsion assembly 504. The electrical power output to the second propulsion assembly 504 from the second fuel cell 582 helps compensate for the increase in electrical load on the second turbomachine 506, thereby minimizing or preventing problems associated with electrical load changes on the second turbomachine 506 (such as those problems described above).

It will be understood that, although described above with respect to increases in electrical load, the controller 240 also can cause the propulsion system 10 to modify the output (i.e., the output products or the power output) of a respective fuel cell in response to a decrease in electrical load on a respective turbomachine. Further, in response to receiving data indicative of a change in the electrical load on two or more turbomachines of the propulsion system 10, the controller 240 could be configured to cause the propulsion system 10 to modify the output of a fuel cell associated with each turbomachine of the two or more turbomachines. Additionally, or alternatively, where a fuel cell assembly of an associated turbomachine includes two or more fuel cells, the controller 240 may be configured to execute instructions that cause the propulsion system 10 to modify the output of one or more of the fuel cells associated with a respective turbomachine. For example, the propulsion system 10 may modify the output products or electrical power output of a fuel cell stack 232 of the first fuel cell assembly 576 and/or the second fuel cell assembly 580.

As one example, in addition to receiving data indicative of a change in a first electrical load on the first turbomachine 502, the controller 240 may receive data indicative of a change in a second electrical load on the second turbomachine 506. As a result, the controller 240 may execute instructions that cause the propulsion system 10 to modify the output products of the first fuel cell 578 and to modify the output products of the second fuel cell 582. In other embodiments, the controller 240 may execute instructions that cause the propulsion system 10 to modify the electrical power output of the first fuel cell 578 and to modify the electrical power output of the second fuel cell 582. In still other embodiments, the controller 240 may execute instructions that cause the propulsion system 10 to modify the electrical power output of the first fuel cell 578 to both the first propulsion system 500 and the second propulsion system 504 or to modify the electrical power output of the second fuel cell 582 to both the first propulsion system 500 and the second propulsion system 504.

In at least some embodiments, modifying the output products of the fuel cell (e.g., the first fuel cell 578 and/or the second fuel cell 582) in response to receiving data indicative of the propulsion system thrust discrepancy comprises modifying a composition of the output products. For example, rather than adding fuel or increasing the fuel flow to the turbomachine, which would increase the turbomachine temperature, the composition of the output products from the fuel cell may be changed to increase the work of the turbomachine. As an example, the gas composition of the fuel cell output products may be modified by decreasing an electrical power output of the fuel cell assembly. As a result, a fuel utilization of the fuel cell assembly will also be decrease, resulting in a higher percent composition of, e.g., hydrogen gas ($H_2$) in the output products. Additionally or alternatively, the fuel cell assembly be operated to increase a temperature of the output products (e.g., by heating the airflow to the cathode, by extracting airflow from the compressor section at a higher temperature, etc.) to increase the work of the turbomachine. A fuel flow to the anode of the fuel cell may be increased in conjunction with these operations to maintain a desired electrical power output despite the decrease in fuel utilization. As such, the enthalpy of the exhaust from the fuel cell is changed, e.g., rather than changing the power provided by the fuel cell, to augment the work of the turbomachine.

A change in electrical load that triggers modifying the output (the output products or the electrical power output) of the fuel cell may be determined in multiple ways. For example, the electrical load may exceed or fall below a threshold value to be a change in electrical load on a turbomachine (such as the first turbomachine 502 and/or the second turbomachine 506) sufficient to warrant modifying the output products or electrical power output of the fuel cell (such as the first fuel cell 578 and/or the second fuel cell 582). As another example, the electrical load may increase or decrease by a predetermined amount over a predetermined time interval, which can indicate a rapid increase or a rapid decrease in the electrical load. For instance, if the electrical load changes by a predetermined voltage within a predetermined number of milliseconds, the controller 240 may determine that the controller 240 has received data indicative of a change in electrical load on a turbomachine, and, thus, a propulsion system thrust discrepancy, such that the output products or electrical power output of an associated fuel cell should be modified.

As described herein, the electrical network 510 is configured to transfer an electrical load to or from each turbomachine included in the propulsion system 10, e.g., the first turbomachine 502, the second turbomachine 506, or both, through one or more electric machines. In at least some embodiments, receiving data indicative of a propulsion system thrust discrepancy includes determining an electrical load has been removed from the electrical network 510. For instance, the electrical load may be provided by one or more electric machines coupled to the electric network 510, such as the first electric machine 584, the second electric machine 586, the third electric machine 588, the fourth electric machine 590, and/or the fifth electric machine 574. In such embodiments, receiving data indicative of the change in the electrical load on a turbomachine (e.g., the first turbomachine 502 and/or the second turbomachine 506) may include determining at least one electric machine 584, 586, 588, 590, 574 has ceased demanding electrical power or is electrically disconnected from the electrical network 510, which indicates the electrical load has been removed from the electrical network 510.

Although described above with respect to changes in electrical load or electrical demand on the propulsion system 10, it will be appreciated that a propulsion system thrust discrepancy also may arise due to a change in one or more mechanical loads on the propulsion system 10. For example, a change in output from a hydraulic pump may increase or decrease a mechanical load on the first propulsion assembly 500 and/or the second propulsion assembly 504, which leads to a thrust imbalance between the first propulsion assembly 502 and the second propulsion assembly 504, and the thrust imbalance or thrust discrepancy is overcome by modifying the output of one or more fuel cells as described herein. It will be understood that various components, assemblies, and systems may contribute to the mechanical load on one or more of the propulsion assemblies 500, 504, 508 of the propulsion system 10. Further, a change in mechanical load, a change in electrical load, or a combination thereof may contribute to a propulsion system thrust discrepancy.

In some embodiments, receiving data indicative of a propulsion system thrust discrepancy comprises receiving data of a change in rotational speed of a shaft of at least one of the first propulsion assembly 500, the second propulsion assembly 504, and the third propulsion assembly 508. As described herein, the propulsion system 10 may include one or more sensors, such as a fuel cell sensor 302 configured to sense data indicative of a fuel cell assembly operating parameter and/or a gas turbine engine sensor 330 configured to sense one or more gas turbine engine operating conditions or parameters. In the embodiments of the propulsion system 10 shown in FIGS. 7 and 8, the propulsion system 10 includes one or more shaft sensors 592, which are each configured to sense a rotational speed of an associated shaft. For example, a first shaft sensor 592 may be disposed on the HP shaft/spool 534 of the first turbomachine 502 to sense the rotational speed of the HP shaft/spool 534; a second shaft sensor 592 may be disposed on the LP shaft/spool 536 of the first turbomachine 502 to sense the rotational speed of the LP shaft/spool 536; a third shaft sensor 592 may be disposed on the HP shaft/spool 560 of the second turbomachine 506 to sense the rotational speed of the HP shaft/spool 560; and a fourth shaft sensor 592 may be disposed on the LP shaft/spool 562 of the second turbomachine 506 to sense the rotational speed of the LP shaft/spool 562. The shaft sensor(s) 592 may be in addition to the fuel cell sensor(s) 302 (FIG. 5) and/or the gas turbine engine sensor(s) 330 (FIG. 6). Alternatively, one or more of the fuel cell sensor(s) 302, the gas turbine engine sensor(s) 330, and the shaft sensor(s) 592 may be omitted from the propulsion system 10.

Thus, the propulsion system thrust discrepancy can be indicated through the change in rotational speed of a shaft/spool of the turbomachine. For instance, the first shaft sensor 592, disposed on the HP shaft/spool 534, may sense a change in the rotational speed of the HP shaft/spool 534 sufficient to indicate a thrust imbalance that could result in one or more of the above-identified problems associated with thrust imbalances, such as rapid and/or drastic increases or decreases in electrical load. As an example, the first shaft sensor 592 may sense the rotational speed of the HP shaft/spool 534 has increased or decreased below a threshold rotational speed, which indicates a change in mechanical or electrical load on the first turbomachine 502. As described herein, in some embodiments, when the controller 240 receives such data indicative of a propulsion system thrust discrepancy, the controller 240 executes instructions that cause the propulsion system 10 to modify the output products of, e.g., the first fuel cell 578 and thereby modify the work of the first turbomachine 502 and the rotational speed of the HP shaft/spool 534. In other embodiments, when the controller 240 receives such rotational speed data indicative of the propulsion system thrust discrepancy, the controller 240 executes instructions that cause the propulsion system 10 to modify the electrical power output of the first fuel cell 578 and thereby modify the electrical power provided to one or more propulsion assemblies (e.g., the first propulsion assembly 500, the second propulsion assembly 504, and/or the third propulsion assembly 508), e.g., through the electrical network 510.

In at least certain embodiments, in addition to modifying the output products or electrical power output of one or more fuel cells, other parameters may be changed or modified to compensate for a propulsion system thrust discrepancy. For example, in response to receiving data indicative of a change in the electrical load on one or more turbomachines, the instructions executed by the controller 240 cause the propulsion system 10 to perform operations that further include modifying an electrical power output of an electric machine, such as the first electric machine 584, the second electric machine 586, the third electric machine 588, the fourth electric machine 590, and/or the fifth electric machine 574. Thus, as described herein, at least one propulsion assembly (e.g., the first propulsion assembly 500, the second propulsion assembly 504, and/or the third propulsion assembly 508) may be coupled to an electric machine (e.g., the first electric machine 584, the second electric machine 586, the third electric machine 588, the fourth electric machine 590, and/or the fifth electric machine 574), and modifying the electrical power output of the electric machine comprises modifying the electrical power output of the electric machine to the at least one propulsion assembly. One or more of the electric machines 584, 586, 588, 590 may extract or inject power to slow down or speed up a respective turbomachine shaft (e.g., HP shaft 534, LP shaft 536, HP shaft 560, and/or LP shaft 562) and thereby effect the thrust provided by the respective turbomachine 502, 506.

As an example of modifying an electrical power output of an electric machine, in some embodiments, the propulsion system includes the first propulsion assembly 500, the first turbomachine 502, and the second propulsion assembly 504, with the second electric machine 586 coupled to the first turbomachine 502 and the fourth electric machine 590 coupled to the second propulsion assembly 504. In such embodiments, the electrical power output of either or both of the second electric machine 586 and the fourth electric machine 590 may be adjusted or modified together with an output of a fuel cell of the propulsion system 10 to bring the propulsion system thrust back into balance after a disturbance to the thrust that leads to thrust asymmetry. For instance, a disturbance to the propulsion system 10 may cause the thrust output of the first propulsion assembly 500 to exceed the thrust output of the second propulsion assembly 504; in such a scenario, either the thrust output of the first propulsion assembly 500 can be reduced or the thrust output of the second propulsion assembly 504 can be increased (or a combination thereof) to balance the thrust provided by the propulsion system 10. In some embodiments, the controller 240 may reduce the electrical power output of the second electric machine 586 and modify the output products of the first fuel cell 578 to decrease the exhaust enthalpy of the first fuel cell 578 to reduce the thrust output of the first propulsion assembly 500. In other embodiments, the controller 240 may execute instructions to increase the electrical power output of the first fuel cell 578 and thereby decrease the work of the first turbomachine 502 to reduce the thrust output of the first propulsion assembly 500. Meanwhile, the increased electrical power output of the first fuel cell 578 may be transferred to the fourth electric machine 590, which, in "motor mode" (as opposed to "generator mode"), increases the speed/thrust provided by the second propulsion assembly 504. Thus, in either embodiment (or in a combination of these embodiments), by adjusting a fuel cell output together with the electrical power output of one or more electric machines, the thrust imbalance between the first propulsion assembly 500 and the second propulsion assembly 504 can be overcome to bring the thrust asymmetry to zero. Accordingly, it will be appreciated that the propulsion system 10 may include an electric machine and a fuel cell that can work together to balance the thrust of the propulsion system 10.

Other parameters that, along with the output of a fuel cell, may be changed in response to a propulsion system thrust discrepancy of the propulsion system 10 include an electrical power output of one or more electrical devices, a fan blade pitch of a fan of a propulsion system, a variable geometry of a propulsion system, an auxiliary load on the turbomachine, an accessory load outside of the turbomachine, and the flow of aviation fuel to the combustion section of the turbomachine. For instance, the controller 240 may be configured such that the instructions executed by the one or more processor(s) 332A cause the propulsion system 10 to perform operations that further include adjusting at least one of (i) an electrical power output of one or more electrical devices, e.g., one or more electrical storage devices, which may be separate devices or part of an energy storage system (ESS) 594, which can include one or more batteries (e.g., Li-ion batteries), supercapacitors, etc. that may be charged to store electricity/energy at a first time A and then release the stored electricity/energy at a second time B; (ii) a fan blade pitch of a fan, e.g., the pitch of the fan blades 514 of the fan 512 of the first propulsion assembly 500, the pitch of the fan blades 540 of the fan 538 of the second propulsion assembly 504, and/or the pitch of the fan blades 566 of the fan 564 of the third propulsion assembly 508; (iii) a variable geometry of the propulsion system 10, such as the position of variable inlet guide vanes (IGVs) and/or variable outlet guide vanes (OGVs), variable exhaust geometry, etc.; (iv) one or more auxiliary loads 596 on the turbomachine, such as one or more accessory systems (e.g., a lubrication oil system, a fuel pump, a thermal management system, an engine anti-icing unit, an electronics control unit, etc.); (v) one or more electrical loads 598 outside of the engine or turbomachine, such as those in an aircraft fuselage (and coupled to a main distribution bus), which may include an environmental control system, anti-icing unit, flight control, landing gears, galley, brakes, etc.; and (vi) the flow of aviation fuel to the combustion section of the turbomachine, such as the first flow F1 of aviation fuel to the first turbomachine 502 and/or the second flow F2 of aviation fuel to the second turbomachine 506. It will be understood that adjusting the geometry of a variable geometry component includes modifying an opening size of an opening in the component, varying the size and/or shape of the component, etc. Thus, one or more parameters may be adjusted in tandem with modifying the output of a fuel cell to bring the thrust provided by the propulsion system 10 back into balance following a disruption of the thrust balance, e.g., by modifying the power consumption of or shedding some electrical loads to provide additional power to a propulsion assembly to achieve thrust balance or by modifying the work of a turbomachine (e.g., through increased or decreased fuel flow) to adjust the thrust output of a propulsion assembly.

Figure 9:
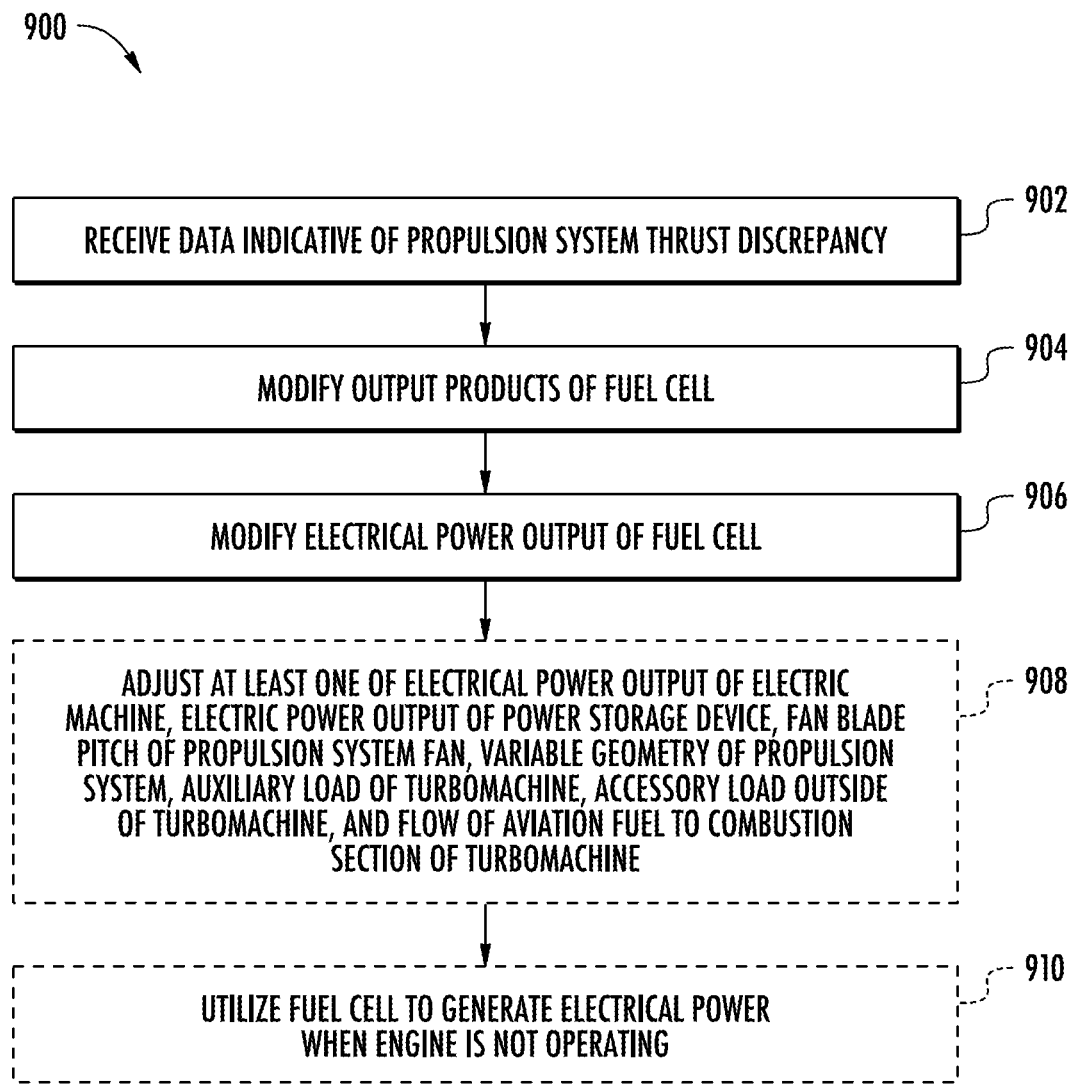
FIG. 9 is a flow diagram of a method of operating a propulsion system for an aircraft in accordance with another exemplary aspect of the present disclosure.

Referring now to FIG. 9, the present subject matter also includes various methods of operating a propulsion system for an aircraft. FIG. 9 depicts a method 900 of operating the propulsion system 10 as described above. As shown in FIG. 9, the method 900 includes (902) receiving data indicative of a change in a propulsion system thrust discrepancy, such as actual sensor data or a change in an electrical load on a turbomachine (such as the first turbomachine 502 and/or the second turbomachine 506) as described herein. As further illustrated in FIG. 9, the method 900 includes (904) modifying the output products of one or more fuel cells in response to receiving data indicative of the propulsion system thrust discrepancy. As described above, modifying the output products of the one or more fuel cells can include modifying the output products of the first fuel cell 578 and/or the second fuel cell 582, which may depend on whether the propulsion system 10 includes one or both of the first fuel cell 578 and the second fuel cell 582. Further, as described herein, receiving data indicative of the propulsion system thrust discrepancy may include determining whether one or more electrical loads have been removed from the electrical network 510, which can electrically couple one or more electrical loads with the one or more turbomachines. Moreover, receiving data indicative of a propulsion system thrust discrepancy can include receiving data of a change in rotational speed of one or more shafts of one or more turbomachines, e.g., using one or more shaft sensors 592 as described above.

In at least some embodiments, modifying the output products of the one or more fuel cells in response to receiving data indicative of the change in the one or more electrical loads on the one or more turbomachines comprises modifying a composition of the output products. For example, modifying the composition of the output products may include increasing or decreasing a fuel utilization (e.g., increasing or decreasing an electrical power provided from the fuel cell assembly), increasing or decreasing a fuel flow to the fuel cell, increasing or decreasing an airflow to the fuel cell, or a combination thereof.

Moreover, as shown in FIG. 9, the method 900 optionally includes (906) modifying an electrical power output of one or more fuel cells in response to receiving data indicative of the propulsion system thrust discrepancy. For instance, as described herein, the propulsion system 10 may include at least one fuel cell, such as first fuel cell 578 and/or second fuel cell 582, which may be electrically coupled with the first turbomachine 502 and/or the second turbomachine 506, e.g., directly or through the electric network 510. As an example, the propulsion system 10 may include a fuel cell assembly, such as the first fuel cell assembly 576; a first propulsion assembly 500 including the first turbomachine 502 and an electric machine, such as the first electric machine 584 and/or the second electric machine 586; and a second propulsion assembly 504 in electric communication with the fuel cell assembly (e.g., the first fuel cell assembly 576). In such embodiments, receiving data indicative of the propulsion system thrust discrepancy may include receiving data indicative of a thrust imbalance between the first propulsion assembly 500 and the second propulsion assembly 504, such that modifying an electrical power output of the fuel cell includes modifying the electrical power output of the first fuel cell 578 to the second propulsion assembly 504.

As further illustrated in FIG. 9, the method 900 optionally includes (908) adjusting at least one of an electrical power output of one or more electrical devices, a fan blade pitch of a fan of a propulsion system, a variable geometry of the propulsion system, one or more auxiliary loads on the turbomachine, one or more accessory loads outside of the turbomachine, and the flow of aviation fuel to the combustion section of one or more turbomachines of the propulsion system 10. As described herein, the one or more electrical devices may be one or more electric machines and/or power storage devices, such as batteries or the like, which may be part of an energy storage system (ESS). Moreover, the fan blade pitch may be the pitch of the fan blades 514 of the fan 512 of the first propulsion assembly 500, the pitch of the fan blades 540 of the fan 538 of the second propulsion assembly 504, and/or the pitch of the fan blades 566 of the fan 564 of the third propulsion assembly 508. The variable geometry can include any variable geometry of the propulsion system, such as a variable size and/or shape of a component and/or the relative position of two or more elements of a multi-piece component, e.g., variable IGVs and/or OGVs.

Referring still to FIG. 9, the method 900 optionally includes (910) utilizing the fuel cell (e.g., the first fuel cell 578 and/or the second fuel cell 582) to generate electrical power when an engine incorporating the fuel cell (such as the first gas turbine engine 100A and/or the second gas turbine engine 100B) is not operating. As described herein, the first fuel cell assembly 576, including the first fuel cell 578 (which may be part of a first fuel cell stack), and the second fuel cell assembly 580, including the second fuel cell 582 (which may be part of a second fuel cell stack), are capable of producing electrical power. Such electrical power may be used to start the engine and/or for other electrical power needs when the engine is not operating, such that the engine cannot produce electricity. Although shown as the last block in the flow diagram of method 900, it will be appreciated that utilizing electricity generated by the fuel cell may occur at any point within the method 900.

Figure 10:
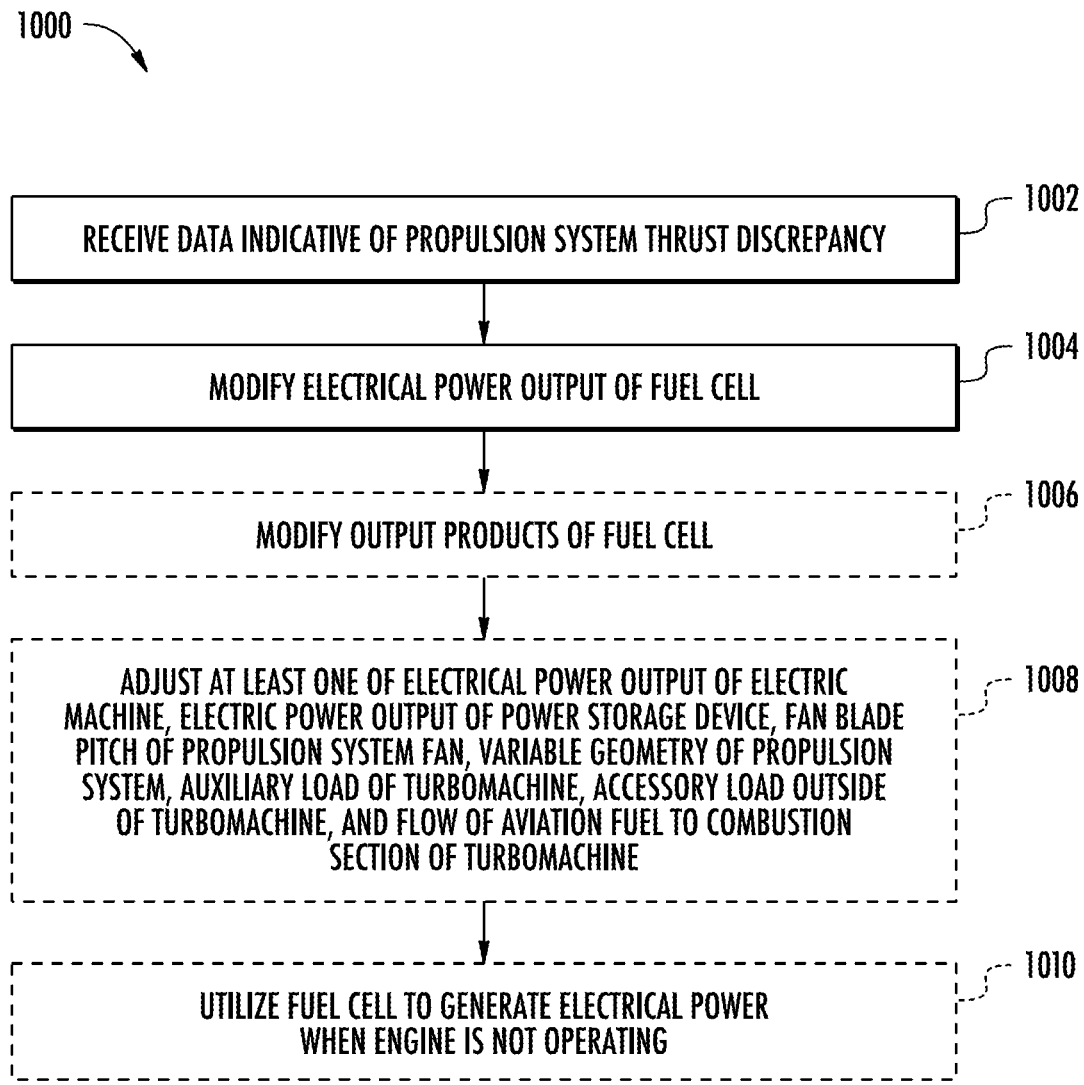
FIG. 10 is a flow diagram of a method of operating a propulsion system for an aircraft in accordance with another exemplary aspect of the present disclosure.

Turning now to FIG. 10, a flow diagram is provided of another method of operating a propulsion system for an aircraft. FIG. 10 depicts a method 1000 of operating the propulsion system 10 as described above. As shown in FIG. 10, the method 1000 includes (1002) receiving data indicative of a propulsion system thrust discrepancy, such as actual sensor data or a change in an electrical load on a turbomachine (such as the first turbomachine 502 and/or the second turbomachine 506) as described herein. As further illustrated in FIG. 10, the method 1000 includes (1004) modifying the electrical power output of one or more fuel cells in response to receiving data indicative of the propulsion system thrust discrepancy. As described above, modifying the electrical power output of the one or more fuel cells can include modifying the electrical power output of the first fuel cell 578 and/or the second fuel cell 582, which may depend on whether the propulsion system 10 includes one or both of the first fuel cell 578 and the second fuel cell 582. Further, as described herein, receiving data indicative of the propulsion system thrust discrepancy may include determining whether the one or more electrical loads have been removed from the electrical network 510, which can electrically couple one or more electrical loads with the one or more turbomachines of the propulsion system 10. Moreover, receiving data indicative of a propulsion system thrust discrepancy can include receiving data of a change in rotational speed of one or more shafts of one or more turbomachines, e.g., using one or more shaft sensors 592 as described above.

Moreover, as shown in FIG. 10, the method 1000 optionally includes (1006) modifying output products of one or more fuel cells in response to receiving data indicative of the propulsion system thrust discrepancy. For instance, as described herein, the propulsion system 10 may include at least one of a first fuel cell 578 and a second fuel cell 582, which may be coupled with the first turbomachine 502 and/or the second turbomachine 506, e.g., through an outlet from the respective fuel cell positioned to remove output products from the respective fuel cell to the respective turbomachine configured to receive the output products from the respective fuel cell. Thus, modifying the output products of one or more fuel cells may include changing the composition of output products removed from a fuel cell and delivered to a turbomachine, e.g., to increase or decrease the work of the turbomachine as described herein.

As further illustrated in FIG. 10, the method 1000 optionally includes (1008) adjusting at least one of an electrical power output of one or more electrical devices, a fan blade pitch of a fan of a propulsion system, a variable geometry of the propulsion system, one or more auxiliary loads on the turbomachine, one or more accessory loads outside of the turbomachine, and the flow of aviation fuel to the combustion section of one or more turbomachines of the propulsion system 10. As described herein, the one or more electrical devices may be one or more electric machines and/or power storage devices, such as batteries or the like, which may be part of an energy storage system (ESS). Moreover, the fan blade pitch may be the pitch of the fan blades 514 of the fan 512 of the first propulsion assembly 500, the pitch of the fan blades 540 of the fan 538 of the second propulsion assembly 504, and/or the pitch of the fan blades 566 of the fan 564 of the third propulsion assembly 508. The variable geometry can include any variable geometry of the propulsion system, such as a variable size and/or shape of a component and/or the relative position of two or more elements of a multi-piece component, e.g., variable IGVs and/or OGVs.

Referring still to FIG. 10, the method 1000 optionally includes (1010) utilizing the fuel cell (e.g., the first fuel cell 578 and/or the second fuel cell 582) to generate electrical power when an engine incorporating the fuel cell (such as the first gas turbine engine 100A and/or the second gas turbine engine 100B) is not operating. As described herein, the first fuel cell assembly 576, including the first fuel cell 578 (which may be part of a first fuel cell stack), and the second fuel cell assembly 580, including the second fuel cell 582 (which may be part of a second fuel cell stack), are capable of producing electrical power. Such electrical power may be used to start the engine and/or for other electrical power needs when the engine is not operating, such that the engine cannot produce electricity. Although shown as the last block in the flow diagram of method 1000, it will be appreciated that utilizing electricity generated by the fuel cell may occur at any point within the method 1000.

It will be appreciated that the method 900 and/or the method 1000 can include other variations as described above, e.g., with respect to FIGS. 7 and 8. For example, the propulsion system 10 may vary in configuration (e.g., varying as to number of turbomachines, number of propulsion assemblies, number of fuel cells, number of electric machines and/or the connection of a respective electric machine to a component of the propulsion system 10, etc.) as described herein.

Further aspects are provided by the subject matter of the following clauses:

A propulsion system for an aircraft, the propulsion system comprising a fuel cell assembly comprising a fuel cell; and a turbomachine; a controller comprising memory and one or more processors, the memory storing instructions that when executed by the one or more processors cause the propulsion system to perform operations including: receiving data indicative of a propulsion system thrust discrepancy, and modifying an output of the fuel cell in response to receiving data indicative of the propulsion system thrust discrepancy.

The propulsion system of any preceding clause, wherein the propulsion system further comprises an electric machine rotatable with the turbomachine, wherein the turbomachine, the electric machine, or both are configured to contribute to a propulsion system thrust generation during operation of the propulsion system.

The propulsion system of any preceding clause, wherein the fuel cell defines an outlet positioned to remove output products from the fuel cell, wherein the turbomachine is configured to receive the output products from the fuel cell, and wherein the output of the fuel cell is the output products of the fuel cell.

The propulsion system of any preceding clause, wherein modifying the output products of the fuel cell in response to receiving data indicative of the propulsion system thrust discrepancy comprises modifying a composition of the output products.

The propulsion system of any preceding clause, further comprising a first propulsion assembly comprising the turbomachine and the electric machine; and a second propulsion assembly, wherein the first and second propulsion assemblies are configured to be on opposing sides of the aircraft when the propulsion assembly is installed on the aircraft, wherein receiving data indicative of the propulsion system thrust discrepancy includes receiving data indicative of a thrust imbalance between the first propulsion assembly and the second propulsion assembly, and wherein modifying the output products of the fuel cell comprises modifying the output products of the fuel cell to the turbomachine.

The propulsion system of any preceding clause, wherein receiving data indicative of the propulsion system thrust discrepancy includes receiving data indicative of a higher proportion of thrust coming from the second propulsion assembly relative to a balanced operation, and wherein modifying the output products of the fuel cell comprises modifying the output products of the fuel cell to increase a thrust generation of the first propulsion assembly.

The propulsion system of any preceding clause, wherein the output of the fuel cell is an electrical power output of the fuel cell.

The propulsion system of any preceding clause, further comprising a first propulsion assembly comprising the turbomachine and an electric machine rotatable with the turbomachine, wherein the turbomachine, the electric machine, or both are configured to contribute to a propulsion system thrust generation during operation of the propulsion system; and a second propulsion assembly in electric communication with the fuel cell assembly, wherein receiving data indicative of the propulsion system thrust discrepancy includes receiving data indicative of a thrust imbalance between the first propulsion assembly and the second propulsion assembly, wherein modifying the output of the fuel cell in response to receiving data indicative of the propulsion system thrust discrepancy comprises modifying an electrical power output to the second propulsion assembly.

The propulsion system of any preceding clause, further comprising an electrical network electrically coupled to the fuel cell assembly and the electric machine, wherein receiving data indicative of the propulsion system thrust discrepancy comprises receiving data indicative of a change in an electrical load on the turbomachine.

The propulsion system of any preceding clause, wherein receiving data indicative of the change in the electrical load on the turbomachine comprises receiving sensor data of a change in rotational speed of a shaft of at least one propulsion assembly.

The propulsion system of any preceding clause, wherein receiving data indicative of the propulsion system thrust discrepancy includes receiving data indicative of a higher proportion of thrust coming from the second propulsion assembly relative to a balanced operation, and wherein modifying the output of the fuel cell comprises decreasing an electrical power output to the second propulsion assembly.

The propulsion system of any preceding clause, wherein modifying the output of the fuel cell in response to receiving data indicative of the propulsion system thrust discrepancy further comprises modifying the output products of the fuel cell to increase a thrust generation of the first propulsion assembly.

The propulsion system of any preceding clause, further comprising a first propulsion assembly comprising the turbomachine, an electric machine rotatable with the turbomachine, and a variable pitch fan; and a second propulsion assembly in electric communication with the fuel cell assembly, wherein the operations further include adjusting an electrical power output of the electric machine, an electrical power output of a power storage device, a fan blade pitch of the variable pitch fan, a variable geometry of the first propulsion assembly, an auxiliary load on the turbomachine, an accessory load outside of the turbomachine, a flow of aviation fuel to a combustion section of the turbomachine, or a combination thereof.

The propulsion system of any preceding clause, wherein the fuel cell is a fuel cell stack comprising a plurality of fuel cells.

The propulsion system of any preceding clause, further comprising a first propulsion assembly comprising the turbomachine, wherein the fuel cell assembly is integrated with the first propulsion assembly; and a second propulsion assembly comprising a second turbomachine, a second electric machine rotatable with the second turbomachine, wherein the second turbomachine, the second electric machine, or both are configured to contribute to the propulsion system thrust generation during operation of the propulsion system; and a second fuel cell assembly comprising a fuel cell integrated with the second propulsion system, wherein modifying the output of the fuel cell in response to receiving data indicative of the propulsion system thrust discrepancy further comprises modifying an output of the fuel cell of the second fuel cell assembly in response to receiving data indicative of the propulsion system thrust discrepancy.

A method of operating a propulsion system for an aircraft, the propulsion system comprising a fuel cell assembly comprising a fuel cell and a turbomachine, the method comprising: receiving data indicative of a propulsion system thrust discrepancy; and modifying an output of the fuel cell in response to receiving data indicative of the propulsion system thrust discrepancy.

The method of any preceding clause, wherein the propulsion system further comprises an electric machine rotatable with the turbomachine, wherein the turbomachine, the electric machine, or both are configured to contribute to a propulsion system thrust generation during operation of the propulsion system.

The method of any preceding clause, wherein the fuel cell defines an outlet positioned to remove output products from the fuel cell, wherein the turbomachine is configured to receive the output products from the fuel cell, wherein the output of the fuel cell is the output products of the fuel cell, and wherein modifying the output products of the fuel cell in response to receiving data indicative of the propulsion system thrust discrepancy comprises modifying a composition of the output products.

The method of any preceding clause, modifying the output of the fuel cell in response to receiving data indicative of the propulsion system thrust discrepancy comprises modifying an electrical power output of the fuel cell.

The method of any preceding clause, wherein the propulsion system further comprises a first propulsion assembly comprising the turbomachine; and a second propulsion assembly in electric communication with the fuel cell assembly, wherein receiving data indicative of the propulsion system thrust discrepancy includes receiving data indicative of a thrust imbalance between the first propulsion assembly and the second propulsion assembly, wherein modifying the output of the fuel cell in response to receiving data indicative of the propulsion system thrust discrepancy comprises modifying an electrical power output to the second propulsion assembly.

The method of any preceding clause, wherein the fuel cell defines an outlet positioned to remove output products from the fuel cell, wherein the turbomachine is configured to receive the output products from the fuel cell, wherein the output of the fuel cell is the output products of the fuel cell, and wherein modifying the output of the fuel cell in response to receiving data indicative of the propulsion system thrust discrepancy further comprises modifying the output products of the fuel cell to increase a thrust generation of the first propulsion assembly.

The method of any preceding clause, wherein the propulsion system further comprises a first propulsion assembly comprising the turbomachine, an electric machine rotatable with the turbomachine, and a variable pitch fan; and a second propulsion assembly in electric communication with the fuel cell assembly, wherein the method further comprises: adjusting an electrical power output of the electric machine, an electrical power output of a power storage device, a fan blade pitch of the variable pitch fan, a variable geometry of the first propulsion assembly, an auxiliary load on the turbomachine, an accessory load outside of the turbomachine, a flow of aviation fuel to a combustion section of the turbomachine, or a combination thereof.

The method of any preceding clause, further comprising utilizing the fuel cell to generate electrical power when an engine incorporating the fuel cell is not operating.

A propulsion system for an aircraft, the propulsion system comprising: a fuel cell assembly comprising a fuel cell; a turbomachine; an electric machine rotatable with the turbomachine, wherein the turbomachine, the electric machine, or both are configured to contribute to a propulsion system thrust generation during operation of the propulsion system; and a controller comprising memory and one or more processors, the memory storing instructions that when executed by the one or more processors cause the propulsion system to perform operations including: receiving data indicative of a propulsion system thrust discrepancy, and modifying an output of the fuel cell in response to receiving data indicative of the propulsion system thrust discrepancy.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A propulsion system for an aircraft, the propulsion system comprising:
    a fuel cell assembly comprising a fuel cell;
    a turbomachine;
    a first propulsion assembly comprising the turbomachine and an electric machine rotatable with the turbomachine, wherein the turbomachine, the electric machine, or both are configured to contribute to a propulsion system thrust generation during operation of the propulsion system;
    a second propulsion assembly in electric communication with the fuel cell assembly; and
    a controller comprising memory and one or more processors, the memory storing instructions that when executed by the one or more processors cause the propulsion system to perform operations including:
    receiving data indicative of a propulsion system thrust discrepancy, wherein receiving the data indicative of the propulsion system thrust discrepancy includes receiving data indicative of a thrust imbalance between the first propulsion assembly and the second propulsion assembly, and modifying an output of the fuel cell in response to receiving data indicative of the propulsion system thrust discrepancy, wherein modifying the output of the fuel cell in response to receiving the data indicative of the propulsion system thrust discrepancy comprises modifying an electrical power output to the second propulsion assembly.

2. The propulsion system of claim 1, wherein the fuel cell defines an outlet positioned to remove output products from the fuel cell, wherein the turbomachine is configured to receive the output products from the fuel cell, and wherein the output of the fuel cell is the output products of the fuel cell.

3. The propulsion system of claim 2, wherein modifying the output products of the fuel cell in response to receiving data indicative of the propulsion system thrust discrepancy further comprises modifying a composition of the output products.

4. The propulsion system of claim 2,
wherein the first and second propulsion assemblies are configured to be on opposing sides of the aircraft when the propulsion assembly is installed on the aircraft, wherein receiving the data indicative of the propulsion system thrust discrepancy includes receiving data indicative of a thrust imbalance between the first propulsion assembly and the second propulsion assembly, and wherein modifying the output products of the fuel cell further comprises modifying the output products of the fuel cell to the turbomachine.

5. The propulsion system of claim 4, wherein receiving the data indicative of the propulsion system thrust discrepancy includes receiving data indicative of a higher proportion of thrust coming from the second propulsion assembly relative to a balanced operation, and wherein modifying the output products of the fuel cell further comprises modifying the output products of the fuel cell to increase a thrust generation of the first propulsion assembly.

6. The propulsion system of claim 1, further comprising:
an electrical network electrically coupled to the fuel cell assembly and the electric machine, wherein receiving the data indicative of the propulsion system thrust discrepancy comprises receiving data indicative of a change in an electrical load on the turbomachine.

7. The propulsion system of claim 6, wherein receiving the data indicative of the change in the electrical load on the turbomachine comprises receiving sensor data of a change in rotational speed of a shaft of at least one propulsion assembly.

8. The propulsion system of claim 1, wherein receiving the data indicative of the propulsion system thrust discrepancy includes receiving data indicative of a higher proportion of thrust coming from the second propulsion assembly relative to a balanced operation, and wherein modifying the output of the fuel cell comprises decreasing an electrical power output to the second propulsion assembly.

9. The propulsion system of claim 1, wherein modifying the output of the fuel cell in response to receiving data indicative of the propulsion system thrust discrepancy further comprises modifying the output products of the fuel cell to increase a thrust generation of the first propulsion assembly.

10. The propulsion system of claim 1,
wherein the operations further include adjusting an electrical power output of a power storage device, a fan blade pitch of the variable pitch fan, a variable geometry of the first propulsion assembly, an auxiliary load on the turbomachine, an accessory load outside of the turbomachine, a flow of aviation fuel to a combustion section of the turbomachine, or a combination thereof.

11. The propulsion system of claim 1, wherein the fuel cell is a fuel cell stack comprising a plurality of fuel cells.

12. The propulsion system of claim 1,
wherein the second propulsion assembly comprises a second turbomachine, and a second electric machine rotatable with the second turbomachine, wherein the second turbomachine, the second electric machine, or both are configured to contribute to the propulsion system thrust generation during operation of the propulsion system; and a second fuel cell assembly comprising a fuel cell integrated with the second propulsion system, wherein modifying the output of the fuel cell in response to receiving data indicative of the propulsion system thrust discrepancy further comprises modifying an output of the fuel cell of the second fuel cell assembly in response to receiving data indicative of the propulsion system thrust discrepancy.

13. A method of operating a propulsion system for an aircraft, the propulsion system comprising a fuel cell assembly comprising a fuel cell and a turbomachine, the method comprising:
receiving data indicative of a propulsion system thrust discrepancy, wherein receiving data indicative of the propulsion system thrust discrepancy includes receiving data indicative of a thrust imbalance between a first propulsion assembly and a second propulsion assembly; and modifying an output of the fuel cell in response to receiving data indicative of the propulsion system thrust discrepancy, wherein modifying the output of the fuel cell in response to receiving data indicative of the propulsion system thrust discrepancy comprises modifying an electrical power output to the second propulsion assembly.

14. The method of claim 13, wherein the fuel cell defines an outlet positioned to remove output products from the fuel cell, wherein the turbomachine is configured to receive the output products from the fuel cell, wherein the output of the fuel cell is the output products of the fuel cell, and wherein modifying the output products of the fuel cell in response to receiving data indicative of the propulsion system thrust discrepancy further comprises modifying a composition of the output products.

15. The method of claim 13, wherein the second propulsion assembly is in electric communication with the fuel cell assembly.

16. The method of claim 15, wherein the fuel cell defines an outlet positioned to remove output products from the fuel cell, wherein the turbomachine is configured to receive the output products from the fuel cell, wherein the output of the fuel cell is the output products of the fuel cell, and wherein modifying the output of the fuel cell in response to receiving data indicative of the propulsion system thrust discrepancy further comprises modifying the output products of the fuel cell to increase a thrust generation of the first propulsion assembly.

17. The method of claim 13, wherein the first propulsion assembly comprises the turbomachine, an electric machine rotatable with the turbomachine, and a variable pitch fan,
wherein the second propulsion assembly is in electric communication with the fuel cell assembly, and
wherein the method further comprises:
adjusting an electrical power output of the electric machine, an electrical power output of a power storage device, a fan blade pitch of the variable pitch fan, a variable geometry of the first propulsion assembly, an auxiliary load on the turbomachine, an accessory load outside of the turbomachine, a flow of aviation fuel to a combustion section of the turbomachine, or a combination thereof.

* * * * *